United States Patent
Suzuki et al.

(10) Patent No.: US 8,501,640 B2
(45) Date of Patent: Aug. 6, 2013

(54) PRESSURE-SENSITIVE ADHESIVE COMPOSITION AND PRESSURE-SENSITIVE ADHESIVE SHEET

(75) Inventors: Toshihide Suzuki, Ibaraki (JP); Kenichi Yamamoto, Ibaraki (JP); Akiko Takahashi, Ibaraki (JP); Yutaka Tosaki, Ibaraki (JP); Shouhei Wada, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 379 days.

(21) Appl. No.: 12/578,839

(22) Filed: Oct. 14, 2009

(65) Prior Publication Data
US 2010/0099318 A1     Apr. 22, 2010

(30) Foreign Application Priority Data
Oct. 16, 2008 (JP) ................. 2008-267299

(51) Int. Cl.
*C08F 20/06* (2006.01)
*C09J 133/08* (2006.01)
*C09J 7/04* (2006.01)
*B32B 7/12* (2006.01)

(52) U.S. Cl.
USPC ................ 442/151; 428/343; 428/355 AC; 524/556; 524/560

(58) Field of Classification Search
USPC ................ 428/343, 355 AC; 524/556, 560
See application file for complete search history.

(56) References Cited

U.S. PATENT DOCUMENTS

| | | | |
|---|---|---|---|
| 5,492,950 A * | 2/1996 | Brown et al. | 524/166 |
| 5,851,662 A | 12/1998 | Suzuki et al. | |
| 7,758,958 B2 | 7/2010 | Takahashi et al. | |
| 7,867,610 B2 | 1/2011 | Takahashi et al. | |
| 8,227,533 B2 | 7/2012 | Takahashi et al. | |
| 8,299,156 B2 | 10/2012 | Takahashi et al. | |
| 2003/0077443 A1 * | 4/2003 | Di Stefano | 428/355 AC |

(Continued)

FOREIGN PATENT DOCUMENTS

| | | |
|---|---|---|
| EP | 2 062 955 A1 | 5/2009 |
| EP | 2 172 528 A1 | 4/2010 |

(Continued)

OTHER PUBLICATIONS

European Patent Office, Extended European Search Report in European Patent Application No. 09173088.7-2102 (Feb. 16, 2010).

(Continued)

*Primary Examiner* — Vu A Nguyen
(74) *Attorney, Agent, or Firm* — Leydig, Voit & Mayer, Ltd.

(57) ABSTRACT

The present invention provides a water-dispersed acrylic PSA composition suitable for forming a PSA sheet. The PSA composition contains 100 parts by weight of an acrylic copolymer with a Tg of $-70°$ C. to $-50°$ C. obtained by polymerization of a monomer starting material containing 60 wt % or more of an alkyl (meth)acrylate with a $C_{8\text{-}12}$ alkyl group and 5 wt % or less of a radical polymerizable monomer with a carboxyl group. When an adhesive sheet is formed therefrom, it exhibits an average SUS adhesive strength of 11 N/20 mm or greater, PP adhesive strength of 8.5 N/20 mm or greater, 80° C. hold time of 1 hour or longer, and gap height of 10 mm or less in a curved surface adhesion test.

15 Claims, 2 Drawing Sheets

U.S. PATENT DOCUMENTS

| | | | |
|---|---|---|---|
| 2006/0116455 A1* | 6/2006 | Naito et al. | 524/187 |
| 2007/0207312 A1* | 9/2007 | Ikeya et al. | 428/355 AC |
| 2008/0033095 A1 | 2/2008 | Takahashi et al. | |
| 2008/0138617 A1* | 6/2008 | Takahashi et al. | 428/343 |
| 2009/0137727 A1* | 5/2009 | Takahashi et al. | 524/560 |
| 2010/0087116 A1 | 4/2010 | Takahashi et al. | |

FOREIGN PATENT DOCUMENTS

| | | |
|---|---|---|
| JP | 07-026229 A | 1/1995 |
| JP | 08-209086 A | 8/1996 |
| JP | 08-218040 A | 8/1996 |
| JP | 08-333550 A | 12/1996 |
| JP | 10-279907 A | 10/1998 |
| JP | 11-241053 A | 9/1999 |
| JP | 2000-144085 A | 5/2000 |
| JP | 2000-265140 A | 9/2000 |
| JP | 2001-107007 A | 4/2001 |
| JP | 2001-335767 A | 12/2001 |
| JP | 2002-167557 A | 6/2002 |
| JP | 2002-294209 A | 10/2002 |
| JP | 2003-193006 A | 7/2003 |
| JP | 2005-307114 A | 11/2005 |
| JP | 2006-056936 A | 3/2006 |
| JP | 2006-111818 A | 4/2006 |
| JP | 2008-037959 A | 2/2008 |
| JP | 2008-081567 A | 4/2008 |
| JP | 2008-239871 A | 10/2008 |
| JP | 2008-239872 A | 10/2008 |
| WO | WO 91/12290 A1 | 8/1991 |

OTHER PUBLICATIONS

European Patent Office, Office Action in European Patent Application No. 09173088.7-2102 (May 2, 2011).

Japanese Patent Office, Notice of Reasons for Refusal in Japanese Patent Application No. 2008-267299 (Dec. 6, 2012).

Chinese Patent Office, First Notice of the Opinion on Examination in Chinese Patent Application No. 200910205162.8 (May 16, 2012).

European Patent Office, Office Action in European Patent Application No. 09 173 088.7 (Jun. 27, 2012).

European Patent Office, Communication Pursuant to Article 94(3) EPC in European Patent Application No. 09 173 088.7 (Apr. 25, 2013).

Japan Patent Office, Notification of Submission of Information in Japanese Patent Application No. 2008-267299 (May 23, 2013).

* cited by examiner

[FIG. 1]
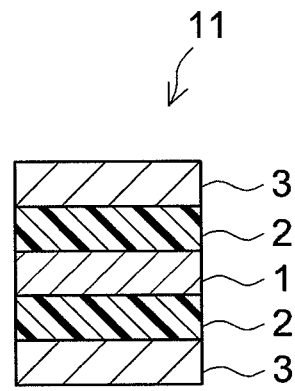
[FIG. 2]
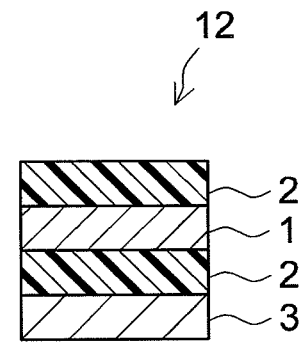
[FIG. 3]
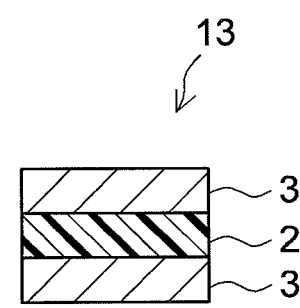

[FIG. 4]
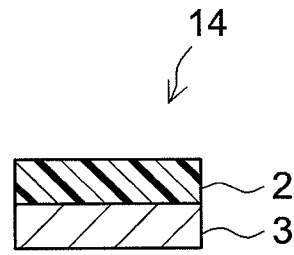
[FIG. 5]
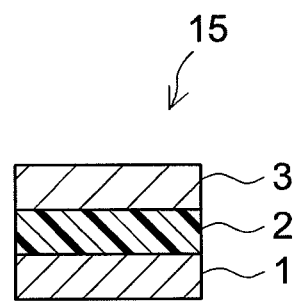
[FIG. 6]
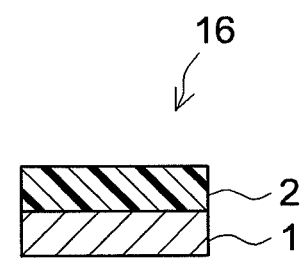

PRESSURE-SENSITIVE ADHESIVE COMPOSITION AND PRESSURE-SENSITIVE ADHESIVE SHEET

BACKGROUND OF THE INVENTION

1. Field of the Invention

The present invention relates to a water-dispersed pressure-sensitive adhesive (PSA) composition comprising an acrylic copolymer as a base polymer, and a PSA sheet using the same.

The present application claims priority based on Japanese Patent Application No. 2008-267299 filed on 16 Oct. 2008, and the entirety thereof is incorporated herein by reference.

2. Description of the Related Art

Acrylic water-dispersed (aqueous) pressure-sensitive compositions comprising an acrylic polymer dispersed in water make use of water as a dispersion medium, and therefore they are preferable to solvent type PSA compositions from the standpoint of protecting the environment. Thus, an acrylic, aqueous pressure-sensitive PSA composition capable of forming a PSA sheet that provides a higher level of performance is in demand for reducing the use of organic solvents. Because of its ease in handling, a double-sided PSA sheet (typically a tape) wherein a PSA layer is formed on both sides of a substrate such as nonwoven fabric, etc., is widely used not only for bonding and laminating paper, synthetic resin films, etc., but also as a bonding means with good working properties and a high level of adhesive reliability in a variety of industrial fields ranging from household appliances to automobiles, various types of machinery, electric and electronic devices, nameplates and labels, etc. Therefore, it will be useful to provide an acrylic aqueous pressure-sensitive PSA composition that can be formed into a double-sided PSA sheet that provides excellent performance in these applications.

Examples of prior art documents relating to acrylic PSAs include Japanese Patent Application Laid-open Nos. 2002-167557, 2002-294209, 2001-335767, H10-279907, H8-209086, 2000-265140, 2003-193006, H8-218040, H8-333550, H11-241053, 2001-107007, and 2006-56936.

SUMMARY OF THE INVENTION

Double-sided PSA sheets need a variety of properties depending on the purpose and use thereof. As an example of one such property, when securing a material comprising an elastic foam such as a polyurethane foam, etc., (typically a foam in the form of a sheet, i.e., a foam sheet) by elastically deforming it to match the surface of an adherend (which can be curved, irregular, etc.), there is the capability of resisting the repulsive force that tries to restore the above material to its shape before deformation and maintaining that material in the aforementioned deformed shape (i.e., capability to resist the aforementioned repulsive force, also called "repulsion resistance" hereinafter). A double-sided PSA sheet used in an application wherein a foam is laminated to an adherend (e.g., in the manufacture of many products wherein the surface of the adherend has a complex shape such as in various machinery, electrical and electronic devices, etc.) can be noted as a typical example of a PSA sheet wherein such repulsion resistance is particularly important. In a case wherein a foam sheet such as a polyurethane foam, etc., is used as a substrate (support), and a double-sided PSA sheet providing a PSA layer to both sides of that substrate is deformed to match the surface shape of an adherend and applied thereto, the property of resisting the repulsive force of the substrate and holding that substrate in the deformed state (repulsion resistance) is needed to prevent the PSA sheet from peeling away from the surface of the adherend. Therefore, it will be useful to provide a double-sided PSA sheet having not only the aforementioned repulsion resistance but also exhibiting excellent adhesive properties (bonding) to also any of a high polar material, such as metal, and low polar material, such as polyolefin, and a high level of cohesiveness (particularly cohesiveness in a high-temperature environment (high-temperature holding strength)).

However, none of the aforementioned prior art has been able to satisfactorily resolve the problem of forming a double-sided PSA sheet using an aqueous acrylic pressure-sensitive PSA composition that manifests the above properties (adhesiveness, high-temperature cohesiveness, and repulsion resistance) at a high level.

Thus, an object of the present invention is to provide an acrylic aqueous pressure-sensitive PSA composition capable of forming a double-sided PSA sheet or other PSA sheet that manifests the above properties at a high level. A further object of the present invention is to provide a PSA sheet (typically a double-sided PSA sheet) formed using that PSA composition.

The present invention provides a water-dispersed PSA composition having a water-dispersed acrylic copolymer (a component L) with a glass transition temperature (Tg) in the range of $-70°$ C. to $-50°$ C. as a base polymer thereof. The PSA composition comprises 10 to 40 parts by weight of a tackifying resin (component T) in relation to 100 parts by weight of the component L based on solid content. The aforementioned component L is an acrylic copolymer obtained by the polymerization of a monomer starting material satisfying the following conditions:

comprising 60 wt % or more of an alkyl (meth)acrylate with a $C_{8-12}$ alkyl group (monomer a); and comprising 5 wt % or less of a radical polymerizable monomer with a carboxyl group (monomer b).

In addition, when a double-sided PSA sheet is fabricated using the PSA composition of the present invention, all of the following properties are satisfied:

(A) an average adhesive strength on stainless steel (SUS adhesive strength) of 11 N/20 mm or grater on either side;

(B) an average adhesive strength on polypropylene (PP adhesive strength) of 8.5 N/20 mm or grater on either side;

(C) a hold time in an $80°$ C. hold test of 1 hour or longer on either side; and (D) a gap height of an edge of a test piece in a curved surface adhesion test of 10 mm or less.

In accordance with this PSA composition, a high performance, double-sided PSA sheet can be formed that exhibits the plurality of properties of adhesiveness, cohesiveness under high temperature conditions, and repulsion resistance at high levels and with good balance. Therefore, the aforementioned PSA composition is most suitable for applications wherein a double-sided PSA sheet or other PSA sheet is formed.

Herein the term "(meth)acrylate" refers to an acrylate and/or methacrylate. Similarly, the term "(meth)acryloyl" refers to an acryloyl and/or methacryloyl.

As the monomer b, an ethylenic unsaturated monomer having one or more (typically one or two) carboxyl groups within a single molecule can be preferably used. In one preferred embodiment, monomer b contains acrylic acid (AA) and methacrylic acid (MAA). A PSA composition containing the component L with such a copolymer formulation can form a PSA sheet with an even higher level of performance. Monomer b preferably contains AA and MAA at a weight ratio, for example, such that AA/MAA is approximately 0.1 to 10. In addition, preferably monomer b is contained in the monomer starting material in an amount of approximately 1 to 3 wt %.

Preferably, the component L constitutes an aqueous emulsion with an average particle size of approximately 0.1 μm to 0.4 μm. A PSA sheet with especially high performance can be formed by a PSA composition containing the component L with such an average particle size.

In one preferred embodiment of the PSA composition disclosed herein, in addition to monomer a and monomer b, the aforementioned monomer starting material comprises one or more types of a monomer (monomer c) selected from alkyl (meth)acrylates with a homopolymer Tg of −25° C. or higher (excluding a compound corresponding to monomer a) and cycloalkyl (meth)acrylates in an amount of 3 to 35 wt %. A PSA sheet with especially high performance can be formed by such a PSA composition. Preferably monomer c has a $C_{1-2}$ alkyl acrylate as a main component thereof.

The aforementioned monomer material can also comprise a monomer (monomer d) capable of forming a silanol group. A PSA sheet with especially high performance can be formed by such a PSA composition. The monomer starting material preferably contains monomer d in an amount of approximately 0.005 to 0.1 wt %.

The present invention also provides a PSA sheet featuring a PSA layer formed from any of the PSA compositions disclosed herein. Because such a PSA sheet can exhibit the aforementioned kind of high performance, it can be preferably used in a variety of applications (e.g., applications for mounting a part in the manufacture of various types of machinery, electrical and electronic devices, automobiles, etc.) More specifically, it can be applied most preferably when using a PSA sheet (typically a double-sided PSA sheet) to secure an elastic foam substrate such as a polyurethane foam, etc., (typically a foam in the form of a sheet, i.e., a foam sheet) or a rigid substrate such as a polyethylene terephthalate (PET) substrate, etc., by deforming it to match the surface of an adherend (which can be curved, irregular, etc.) In addition, because the PSA sheet uses an aqueous (water-dispersed) acrylic pressure-sensitive PSA composition, it is preferred from the standpoint of environmental health. The aforementioned PSA layer preferably is formed to have a gel fraction Gb (weight ratio of the ethyl acetate insoluble component) of 30 to 60%. A PSA sheet featuring a PSA layer with such a gel fraction can exhibit even higher performance. One preferred aspect of the PSA sheet disclosed herein is configured as a double-sided PSA sheet featuring the aforementioned PSA layer on each side of a sheet-like substrate, and satisfying all of the properties (A) through (D) above.

Due to increased awareness about protecting the global environment, there has been a trend in recent years to promote breaking down various manufactured products and reprocessing or reusing (recycling) their components rather than discarding the whole product after use as in the past to save resources, save energy, reduce the amount of refuse, etc. Accompanying this trend, new properties are now sought for PSA sheets used in various manufactured products. More specifically, PSA sheets used for securing parts that are expected to be recycled (hereinafter, also called "parts for recycling") (e.g., doubled-sided PSA sheets used to secure parts for recycling) are required to have the capability of strongly bonding to the part for a long period of time while the product is being used, but when the part is being recycled, also to have the capability of enabling the PSA sheet to be peeled off without adhesive residue remaining on the surface of the part (adhesive residue prevention) and capability for the PSA sheet not to tear during peeling (tearing prevention) in order to perform the removal operation efficiently.

A PSA sheet featuring a PSA layer formed from any of the PSA compositions disclosed herein on either one side or both sides of a substrate sheet can be a PSA sheet that has excellent adhesive residue prevention and tearing prevention (and therefore, excellent recyclability). From the standpoint of the aforementioned tearing prevention, it is preferable for the measured tensile strength of the aforementioned PSA sheet to be approximately 10 N/10 mm or more both in a first direction of the PSA sheet (e.g., lengthwise direction in a long and narrow PSA sheet) and also in a second direction that is perpendicular thereto. For example, in a double-sided PSA sheet featuring the aforementioned PSA layer on both sides of a nonwoven fabric (substrate), the measured tensile strength in both the machine direction and in the transverse direction of the nonwoven fabric is preferably approximately 10 N/10 mm or more.

In one preferred embodiment the total amount of volatile organic compounds (TVOC) emitted from the aforementioned PSA sheet when it is heated for 30 min at 80° C. is 1000 μg or less per 1 g of PSA sheet. A PSA sheet satisfying this property is preferred from the standpoint of protecting the environment. Such a PSA sheet is particularly useful in fields where there is a strong demand for a reduction in VOC, e.g., indoor household appliances, construction materials, the automobile industry, etc.

The present invention provides a water-dispersed PSA composition having a water-dispersed acrylic copolymer (component L) with a glass transition temperature (Tg) in the range of −70° C. to −50° C. as a base polymer thereof, and when a double-sided PSA sheet is fabricated using that PSA composition, all of the following properties are satisfied:

(B) The average adhesive strength on polypropylene of 8.5 N/20 mm or greater on either side;

(C) The hold time in an 80° C. hold test of 1 hour or longer on either side;

(D) The gap height at an edge of a test piece in a curved surface adhesion test is 10 mm or less; and (H) The total amount of volatile organic compounds (TVOC) emitted from the sheet when it is heated for 30 min at 80° C. being 1000 μg or less per 1 g of the PSA sheet. The present invention also provides a PSA sheet featuring a PSA layer formed from that composition (e.g., a double-sided adhesive sheet featuring the aforementioned adhesive layer on both sides of a sheet substrate).

BRIEF DESCRIPTION OF THE DRAWINGS

FIG. 1 is a cross-sectional drawing schematically illustrating one example of a configuration of the PSA sheet of the present invention;

FIG. 2 is a cross-sectional drawing schematically illustrating a different example of a configuration of the PSA sheet of the present invention;

FIG. 3 is a cross-sectional drawing schematically illustrating a different example of a configuration of the PSA sheet of the present invention;

FIG. 4 is a cross-sectional drawing schematically illustrating a different example of a configuration of the PSA sheet of the present invention;

FIG. 5 is a cross-sectional drawing schematically illustrating a different example of a configuration of the PSA sheet of the present invention; and FIG. 6 is a cross-sectional drawing schematically illustrating a different example of a configuration of the PSA sheet of the present invention.

DETAILED DESCRIPTION OF THE INVENTION

Preferred embodiments of the present invention are described below. Matters other than the those specifically disclosed herein that are necessary for the working of the present invention can be considered matters of design for a person skilled in the art based on prior art in this field. In other words, the present invention can be worked based on the content disclosed herein and on common technical knowledge in the field.

The component L in the technology disclosed herein is an aqueous pressure-sensitive acrylic copolymer having a Tg in the range of approximately −70° C. to −50° C. A PSA composition having an acrylic copolymer with a Tg in the above range as a base polymer (main component among the polymer components) can provide a PSA composition that can deliver a high performance PSA sheet (e.g., a double-sided PSA sheet realizing a good balance of adhesiveness, high-temperature cohesiveness, and repulsion resistance at a high level).

If the Tg of the component L is too much lower than −70° C., the cohesiveness of the PSA is likely to be inadequate. As a result, when a PSA sheet that has been continuously bonded to an adherend for a long period of time is peeled off, adhesive residue is likely to remain on the surface of the adherend. On the other hand, if the Tg of the component L is too much higher than −50° C., a PSA sheet using a PSA composition having such the component L as the base polymer thereof is likely to have inadequate adhesion to an adherend with an irregular surface such as a foam, etc. Furthermore, when the aforementioned PSA sheet is one having a porous substrate (support) such as a nonwoven fabric, etc., (typically a double-sided PSA sheet), the impregnation of the porous material will be inadequate, and when the PSA sheet that has been continuously bonded to an adherend for a long period of time is peeled off, adhesive residue is likely to remain, the PSA sheet is likely to tear easily, etc. Preferably the Tg of the component L is in the range of −65° C. to −55° C. (e.g., −63° C. to −58° C.).

Herein the term Tg (glass transition temperature) refers to a value obtained from the Fox equation based on the Tg of a homopolymer of each monomer constituting the monomer starting material and the monomer weight fraction (copolymer blend ratio). The values listed in the publicly known references *Nenchaku Gijutsu Handbook* [Adhesion Technology Handbook], published by Nikkan Kogyo Shimbun [Business and Technology Daily News] or Polymer Handbook published by Wiley-Interscience are used herein for the Tg values of the homopolymers. For example, −70° C. for 2-ethylhexyl acrylate; −54° C. for butyl acrylate; 8° C. for methyl acrylate; 105° C. for methyl methacrylate; 66° C. for cyclohexyl methacrylate; 32° C. for vinyl acetate; 106° C. for acrylic acid; and 228° C. for methacrylic acid are used as Tg values of the homopolymers in the art disclosed herein. Additionally, values calculated by the following method were used for the homopolymer Tg values of monomers not listed in these publicly known references. First, solution polymerization of a target monomer was carried out to synthesize a homopolymer with a weight-average molecular weight of $5 \times 10^4$ to $10 \times 10^4$, and then the obtained homopolymer solution was flow-cast onto a release liner and dried to prepare a test sample. Next, differential scanning calorimetry (DSC) was carried out on the test sample by varying the temperature from −80° C. to 280° C. at a heating rate of 10° C./min using a differential scanning calorimeter (SII NanoTechnology Inc., model DSC6220) and the temperature at the initial stage of heat absorption was used as the Tg for that homopolymer.

The component L is obtained by the polymerization (typically emulsion polymerization) of a monomer starting material comprising at least monomer a and monomer b, and is an acrylic copolymer in a copolymer composition with the Tg calculated by the predetermined calculation method within the abovementioned range.

Monomer a is an alkyl (meth)acrylate having a $C_{8-12}$ alkyl group, and it is a component accounting for 60 wt % or more (typically 60 to 98 wt %, e.g., 60 to 90 wt %) of the total monomer starting material constituting the component L. A monomer starting material containing monomer a at such a ratio is preferred because it is easy to adjust the composition of the monomer starting material so that the Tg of the component L will lie within the aforementioned range. Using this kind of alkyl (meth)acrylate with a relatively large number of carbon atoms in the alkyl group as the main monomer is advantageous for increasing adhesiveness to an adherend with low polarity such as a polyolefin, etc.

Specific examples of the alkyl (meth)acrylate that can be used as monomer a include the following: 2-ethylhexyl (meth)acrylate; octyl (meth)acrylate; isooctyl (meth)acrylate; nonyl (meth)acrylate; isononyl (meth)acrylate; decyl (meth)acrylate; isodecyl (meth)acrylate; undecyl (meth)acrylate; dodecyl (methacrylate); and the like. Provided the Tg of the component L can be adjusted to the above range, these alkyl (meth)acrylate can be used as one type alone or two or more types thereof in combination. Preferred examples of monomer a in the present invention are 2-ethylhexyl acrylate, isooctyl acrylate, and isononyl acrylate. The use of 2-ethylhexyl acrylate and/or iso-octyl acrylate is especially preferred. It is also preferable for one or more types (typically one) selected from a group consisting of alkyl acrylates having a $C_{8-10}$ alkyl group to comprise 70 to 100 wt % of monomer a. For example, a monomer starting material of a composition wherein essentially all of monomer a is 2-ethylhexyl acrylate (2EHA) can be preferably used.

Monomer b is a radical polymerizable monomer having one or more (typically one or two) carboxyl groups within a single molecule, and is a component contained in an amount of 5 wt. % or less based on the total weight of the monomer starting material constituting the component L. If the amount of monomer b is too much greater than the above range, it is very difficult to prepare a composition of monomer starting material such that the Tg of the component L will lie in the aforementioned range. As a result, insufficient bonding to the kind of irregular surface noted above, adhesive residue left behind because of insufficient impregnation into a porous substrate (nonwoven fabric, etc.), and tearing of the PSA sheet are more likely to occur. From this standpoint, it is preferable to set the content of monomer b at 3 wt % or less (e.g., 2.5 wt % or less). On the other hand, if the amount of monomer b is too small, the cohesive force of the PSA is likely to be inadequate. This is thought to occur because it becomes difficult for monomer b to function sufficiently as a crosslinking point in the component L. Such an inadequacy in cohesive strength can be the cause of adhesive residue remaining on the surface of an adherend when a PSA sheet that has been continuously bonded to that adherend for a long period of time is peeled off. Furthermore, if the amount of monomer b is too small, the stability of an aqueous dispersion of the component L (and even the stability of an aqueous dispersion of a PSA composition comprising the component L) is likely to be too low. From this standpoint, normally it is preferable to set the content of monomer b in the monomer starting material at 0.5 wt % or more (more preferably 1 wt % or more).

An ethylenic unsaturated monomer (monomer with one or more ethylenic unsaturated groups such as a (meth)acrylic group, vinyl group, etc., within a single molecule) having at least one (typically one or two) carboxyl groups within a single molecule can be preferably used as monomer b. Specific examples include the following: acrylic acid; methacrylic acid; itaconic acid; itaconic anhydride; crotonic acid; maleic acid; maleic anhydride; 2-(meth)acryloyloxyethyl phthalic acid; 2-(meth)acryloyloxyethyl hexahydrophthalic acid; and the like. One of the above types can be used alone, or two or more types thereof can be used in combination. It can be noted that acrylic acid (AA) and methacrylic acid (MAA) are especially preferred as monomer b in the present invention.

In one preferred embodiment of the present invention AA and MAA are used in combination as monomer b. A PSA composition comprising the component L of such a monomer components (i.e., a polymer components) can deliver a PSA sheet with an even higher level of performance (e.g., even better repulsion resistance). The weight ratio of AA to MAA (AA/MAA) can lie in a range of approximately 0.1 to 10, for example, and a range of approximately 0.3 to 4 (e.g., approximately 0.5 to 3) is even more preferred. If AA/MAA is too much lower than the above range, it becomes difficult to realize an adequate increase in repulsion resistance. However, if AA/MAA is too much higher than the above range, the PSA properties are likely to decrease over time after the PSA sheet is fabricated.

In addition to monomers a and b, the monomer starting material constituting the component L can also contain a different radical polymerizable monomer capable of copolymerization therewith. Thus, it can be a monomer starting material of components comprising one type of such a radical polymerizable monomer, or two or more types thereof used in combination.

Examples of a radical polymerizable monomer can be polymerized with the monomer a and the monomer b include the following: an alkyl (meth)acrylate having a $C_{1-7}$ alkyl group such as methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, pentyl (meth)acrylate, neopentyl (meth)acrylate, hexyl (meth)acrylate, heptyl (meth)acrylate, etc.; or an alkyl (meth)acrylate having an alkyl group of 13 or more carbon atoms (preferably $C_{13-18}$) such as tridecyl (meth)acrylate, stearyl (meth)acrylate, etc.

Other examples of a monomer that can be used as monomer 1c include the following ethylenic unsaturated monomers having various functional groups (hereinafter, referred to as a "functional group-containing monomers"):

an ethylenic unsaturated monomer having an amino group, e.g., an N-alkyl amino alkyl (meth)acrylate such as N-methyl aminoethyl (meth)acrylate, N-ethyl aminoethyl (meth)acrylate, and N-t-butyl aminoethyl (meth)acrylate; or an N,N-dialkyl amino alkyl (meth)acrylate, e.g., N,N-dimethyl aminoethyl (meth)acrylate, N,N-diethyl aminoethyl (meth)acrylate, etc.;

an ethylenic unsaturated monomer having a hydroxyl group, e.g., a hydroxyalkyl (meth)acrylate such as 2-hydroxyethyl (meth)acrylate, 2-hydroxypropyl (meth)acrylate, 3-hydroxypropyl (meth)acrylate, and 2-hydroxybutyl (meth) acrylate; or a vinyl alcohol, allyl alcohol, or N-methylol acrylamide, etc.;

an ethylenic unsaturated monomer having a keto group such as diacetone (meth)acrylamide, diacetone (meth)acrylate, vinyl methyl ketone, vinyl ethyl ketone, allyl acetoacetate, and vinyl acetoacetate, etc.;

an ethylenic unsaturated monomer having an amid group such as (meth)acrylamide, N,N-dimethyl (meth)acrylamide, N-methoxymethyl (meth)acrylamide, and N-butoxymethyl (meth)acrylamide, etc.; and an ethylenic unsaturated monomer having an epoxy group such as glycidyl (meth)acrylate, methylglycidyl (meth)acrylate, and allyl glycidyl ether, etc.

Other examples of a radical polymerizable monomer include the following: a polyfunctional (meth)acrylate, i.e., an ethylenic unsaturated monomer having two or more (meth) acryloyl groups in one molecule such as ethylene glycol di(meth)acrylate, glycerol di(meth)acrylate, dipropylene glycol di(meth)acrylate, hexanediol di(meth)acrylate, neopentyl glycol di(meth)acrylate, trimethylolpropane tri(meth)acrylate, tetramethylolmethane tri(meth)acrylate, dipentaerythritol hexa(meth)acrylate, etc. Additional examples include an ethylenic unsaturated monomer such as a vinyl ester, e.g., vinyl acetate, vinyl propionate, etc.; an aromatic vinylated compound, e.g., styrene, α-methyl styrene, vinyl toluene, etc.; a (meth)acrylic acid ester of a cyclic alcohol, e.g., cyclopentyl (meth)acrylate, cyclohexyl (meth)acrylate, isobornyl (meth)acrylate, etc.; and also (meth)acrylonitrile, N-(meth) acryloyl morpholine, N-vinyl-2-pyrrolidone, and the like.

Even other examples of radical polymerizable monomers include an ethylenic unsaturated monomer having at least one (preferably two or more, e.g., two or three) alkoxysilyl groups in one molecule, such as 3-(meth)acryloxy propyl trimethoxy silane, 3-(meth)acryloxy propyl triethoxy silane, 3-(meth) acryloxy propyl methyl dimethoxy silane, and 3-(meth)acryloxy propyl methyl diethoxy silane. One type of such a monomer containing an alkoxysilyl group can be used alone, or two or more types thereof can be used in combination. A crosslinking structure due to the condensation reaction of a silanol group (silanol condensation) can be introduced into a PSA formed from the PSA composition comprising the component L through copolymerization with a monomer containing such an alkoxysilyl group. The use of about 0.005 to 0.1 wt % (e.g., 0.01 to 0.03 wt %) of the monomer starting material is suitable.

In one preferred embodiment of the PSA composition disclosed herein, the aforementioned monomer starting material contains one or more types of monomer (monomer c) selected from alkyl (meth)acrylates with a homopolymer Tg of −25° C. or higher (excluding a compound corresponding to monomer a) and cycloalkyl (meth)acrylates at a ratio of approximately 3 to 35 wt % (preferably approximately 5 to 20 wt %) of the total monomer starting material as a radical polymerizable monomer used together with the monomer a and monomer b. Concrete examples of monomer c include methyl acrylate (MA), methyl methacrylate (MMA), ethyl acrylate (EA), ethyl methacrylate (EMA), isostearyl acrylate, cyclohexyl acrylate (CHA), cyclohexyl methacrylate (CHMA), etc.

To describe the preferred formulation of monomer c even further, in general it is preferable to use an acrylate as the main component (component accounting for 50 wt % or more) of monomer c from the standpoint of polymerization reactivity and the like. For example, it is preferable for an alkyl acrylate with a $C_{1-2}$ alkyl group to account for 50 wt % or more (more preferably, 75 wt % or more, and even more preferably, 90 wt % or more) of monomer c. The entirety of monomer c can essentially be an alkyl acrylate with a $C_{1-2}$ alkyl group.

Typically the component L can be obtained by emulsion polymerization of the kind of aforementioned polymer starting material. The mode of emulsion polymerization is not particularly limited herein, and for example, publicly known monomer supply methods, polymerization conditions (polymerization temperature, polymerization time, polymerization pressure, etc.), and materials (polymerization initiator, surfactant, etc.) can be used as needed, and the process can be carried out in the same manner as conventional publicly known general emulsion polymerization. For example, as a method for supplying the monomers to the reaction vessel (polymerization vessel), a batch supply process wherein all the monomer starting material is supplied at once, a continuous feed (drip) process, or a semi-batch feed (drip) process, etc., can all be used. It is also possible to mix all or part of the monomer starting material (typically all) with water (typically an appropriate amount of emulsifier is used together with water) beforehand, emulsify the same, and feed that liquid emulsion (monomer emulsion) into the reaction vessel by a batch, semi-batch, or continuous process. The process that involves dripping the monomer emulsion into the reaction vessel can be preferably used for one or more of the following reasons: it is easy to control the reaction temperature and particle size; a high degree of polymerization is easy to obtain; and it is applicable to the manufacture of an emulsion containing high nonvolatile contents (e.g., 50 wt % or more of nonvolatile contents, typically 50 to 70 wt %).

The following can be used as an emulsifier (surfactant): an anionic emulsifier, e.g., sodium lauryl sulfate, ammonium lauryl sulfate, sodium dodecylbenzene sulfonate, sodium polyoxyethylene alkyl ether sulfate, ammonium polyoxyethylene alkylphenyl ether sulfate, sodium polyoxyethylene alkylphenyl ether sulfate, etc.; and a nonionic emulsifier, e.g., polyoxyethylene alkyl ether, polyoxyethylene alkylphenyl ether, and the like. A radical polymerizable emulsifier (reactive emulsifier) with a structure wherein a radical polymerizable group (propenyl group, etc.) is inserted into the kind of aforementioned anionic or nonionic emulsifier can be used. Such an emulsifier can be used as one type alone, or two or more types thereof can be used in combination. The amount of emulsifier to be used (based on solid content) can be, for example, approximately 0.2 to 10 parts by weight (preferably, approximately 0.5 to 5 parts by weight) in relation to 100 parts by weight of monomer starting material.

Either a water-soluble or oil-soluble polymerization initiator can be used. Examples include azo initiators, e.g., 2,2'-azobis isobutyronitrile, 2,2'-azobis(2-methylpropionamidine)disulfate, 2,2-azobis(2-amidinopropane) dihydrochloride, 2,2'-azobis[2-(5-methyl-2-imidazolin-2-yl) propane]dihydrochloride, 2,2'-azobis(N,N'-dimethylene isobutyl amidine)dihydrochloride, and 2,2'-azobis[N-(2-carboxyethyl)-2-methyl propionamidine]hydrate, etc.; persulfates such as potassium persulfate, ammonium persulfate, etc.; peroxide initiators such as benzoyl peroxide, t-butyl hydroperoxide, hydrogen peroxide, etc.; redox initiators wherein a peroxide and a reducing agent are combined such as a combination of a persulfate and sodium hydrogen sulfite, a combination of a peroxide and sodium ascorbate, etc.; and the like, but these examples are not limited thereto. The amount of polymerization initiator to be used can be suitably selected in accordance with the type of initiator, types of monomers (formula of the monomer starting material) and the like, but normally selecting from a range of approximately 0.01 to 1 parts by weight, for example, in relation to 100 parts by weight of the monomer starting material will be appropriate. A batch process wherein essentially all of the polymerization initiator to be used is placed in the reaction vessel (typically, an aqueous solution of the polymerization initiator is prepared in the reaction vessel) before starting the feed of monomer starting material, a continuous process, or a semi-batch process can all be used as the method of supplying the polymerization initiator. From the standpoint of ease of the polymerization operation and easy of process step control, the batch process, for example, can be preferably used. The polymerization temperature can be set, for example, at approximately 20 to 100° C. (typically 40 to 80° C.).

When polymerizing the aforementioned monomer starting material to synthesize the component L, if unreacted (unpolymerized) monomer remains, it can cause an increase in the TVOC (total volatile organic compounds) of the PSA sheet. Therefore, the higher the degree of polymerization of the monomer starting material that can be obtained, the better and, preferably it will be at least 98% or more (typically 98 to 100%, and even more preferably 99 to 100%). Various measures known to be effective for increasing the degree of polymerization (reducing the residual amount of unreacted monomer) can be used either alone or in a suitable combination thereof to realize such a degree of polymerization. Examples of measures that are effective for increasing the degree of polymerization include the following: removing oxygen ($O_2$) from the inside of the reaction vessel before starting polymerization (e.g., carrying out a complete substitution thereof with an inert gas such as $N_2$); extending the polymerization reaction time; and adding a supplemental polymerization initiator (e.g., a redox initiator) to the reaction vessel after the monomer starting material has been fed into the reaction vessel, and the like.

The degree of polymerization referred to herein can be determined, for example, according to the following sequence based on the weight of the nonvolatile component (actual nonvolatile component) remaining after drying the liquid reaction product (e.g., emulsion of the component L) obtained in the above polymerization, and the weight of the nonvolatile component (theoretical nonvolatile component) when the used monomer starting material is 100% polymerized.

[Method for Calculating Degree of Polymerization]

First approximately 1 g (weight $W_{a1}$) of polymerization reaction product is weighed out into an aluminum dish (weight $W_{a2}$), and the weight in each dish (weight $W_{a3}$) is measured after drying at 130° C. for 2 hours. Then the actual non-volatile component is determined by inserting those values into the formula:

Actual non-volatile component [%]=[($W_{a3}$-$W_{a2}$)/$W_{a1}$]×100.

The theoretical non-volatile component is determined from the total weight of the monomer starting material and other materials loaded into the reaction vessel in obtaining the aforementioned polymerization reaction liquid (weight including non-volatile components such as water, etc., weight $W_{a4}$) and the total weight of the non-volatile components of the aforementioned other materials and the monomer starting material (weight $W_{a5}$) by using the following formula:

Theoretical non-volatile component [%]=[$W_{a5}$/$W_{a4}$]×100.

Then the degree of polymerization is determined by the following formula:

Degree of polymerization [%]=[(actual non-volatile component)/(theoretical non-volatile component)]×100.

A chain transfer agent of a conventional, publicly known type (that can also be interpreted as a molecular weight regulator or degree of polymerization regulator) can be used in the aforementioned polymerization process (typically emulsion polymerization). This chain transfer agent can be one or more types selected from the following: mercaptans such as dodecyl mercaptan (dodecanethiol), glycidyl mercaptan, 2-mercapto ethanol, mercaptoacetic acid, 2-ethylhexyl thioglycolate, and 2,3-dimercapto-1-propanol, etc.; an α-methyl styrene dimer; and a terpene such as α-pinene, limonene, terpinol, etc. One type can be used alone or two or more types thereof can be used in combination. The amount of chain transfer agent to be used can be, for example, 0.001 to 1 parts by weight in relation to 100 parts by weight of monomer starting material, and normally about 0.01 to 0.8 parts by weight is preferred.

Although not particularly limited herein, preferably the gel fraction of the water-dispersed acrylic copolymer used as the component L (Gc) (i.e., the weight ratio of the ethyl acetate insoluble component in the copolymer) is approximately 30% to 70%. The gel fraction of the acrylic copolymer Gc can be measured in the following manner.

[Acrylic Copolymer Gel Fraction (Gc) Measurement Method]

Approximately 0.1 g (weight $W_{c1}$ mg) of acrylic copolymer is taken as a sample and wrapped in a tetrafluoroethylene resin porous membrane (weight $W_{c2}$ mg) with an average pore size of 0.2 μm in the form of a pouch, and the mouth is tied shut with a string (weight $W_{c3}$ mg). This pouch is placed in a 50 mL screw-cap tube (one screw-cap tube is used for 1 pouch), and the screw-cap tube is filled with ethyl acetate. After letting this stand at room temperature (typically 23° C.) for 7 days, the pouch is removed and dried for 2 hours at 130° C., and the weight of the pouch (weight $W_{c4}$ mg) is measured. The gel fraction (Gc) of the acrylic copolymer is calculated by inserting the above values into the following formula:

$$Gc\ [\%]=[(W_{c4}-W_{c2}-W_{c3})/W_{c1}]\times 100.$$

Preferably a "NITOFLON™ NTF 1122" from Nitto Denko Corp. or an equivalent product will be used for the aforementioned tetrafluoroethylene resin porous membrane. For example, an emulsion of the component L that has been dried for 2 hours at 130° C. can be used as the sample subjected to the above measurement.

The weight-average molecular weight (Mw) of the component L is preferably about $25\times10^4$ to $130\times10^4$, and more preferably about $30\times10^4$ to $100\times10^4$ (e.g., $40\times10^4$ to $95\times10^4$). If the Mw of the component L is too much lower than the aforementioned range, the cohesiveness of the PSA is likely to be inadequate. As a result, when a PSA sheet that has been continuously bonded to an adherend for a long period of time is peeled off, adhesive residue is likely to remain on the surface of the adherend. If the Mw of the component L is too much greater than the aforementioned range, the adhesiveness to an adherend with an irregular surface (a foam, etc.), is likely to be inadequate. Furthermore, when the aforementioned PSA sheet has a porous substrate (support) such as a nonwoven fabric, etc., (typically a double-sided PSA sheet), the impregnation of the porous material will be inadequate, and as a result when a PSA sheet that has been continuously bonded to an adherend for a long period of time is peeled off, adhesive residue is likely to remain, the PSA sheet is likely to tear easily, etc.

In the present invention the term weight-average molecular weight refers to the polystyrene-converted weight-average molecular weight obtained when a measurement sample (e.g., the non-volatile component obtained by drying an aqueous emulsion of the component L) is extracted with tetrahydrofuran (THF), and the resulting soluble component (also called the sol component) is measured by gel permeation chromatography (GPC).

The component L in the PSA composition disclosed herein can be used in the form of an aqueous emulsion, for example, with an average particle size of 0.05 μm to 0.8 μm (preferably 0.1 μm to 0.7 μm). If the average particle size of the component L is too much smaller than the aforementioned range, it becomes difficult to produce (polymerize) an emulsion containing the component L stably at a high concentration. If the average particle size of the component L is too much larger than the aforementioned range, adhesion between the particles is likely to be inadequate when a PSA layer is formed from a PSA composition containing the component L, and as a result, adhesive residue is likely to remain on the surface of the adherend when the PSA sheet is peeled off.

The average particle size in the present invention is the average particle size obtained using a laser diffraction particle size analyzer (e.g., Beckman-Coulter model LS 13 320).

In one preferred embodiment of the PSA composition disclosed herein, the component L constitutes an aqueous emulsion with an average particle size of 0.1 μm to 0.4 μm. A PSA sheet with an even higher level of performance can be formed by a PSA composition comprising the component L with such a relatively small particle size. The polymerization conditions (e.g., type of emulsifier, amount used, method of use, etc.) of the monomer starting material can be set so that an aqueous emulsion of the component L satisfying such an average particle size will be formed.

From the standpoint of productivity of a PSA sheet, preferably the non-volatile component (NV) of the aforementioned PSA composition is 40% or higher, and more preferably 45% or higher. The upper limit of the NV is not particularly limited herein, but from the standpoint of ease of manufacturing and storage stability, normally it is preferable to set the NV at 70% or lower (e.g., 60% or lower). Because a PSA composition satisfying such an NV is easy to obtain, preferably the NV of the aqueous emulsion of the component L is 45% or higher (even more preferably 50% or higher, typically 70% or lower).

The measurement of NV can be carried out in the following manner. First, approximately 1 g (weight $W_{c1}$) of the object to be measured is weighed out in an aluminum dish (weight $W_{c2}$), and the weight of each dish is measured after drying at 130° C. for 2 hours (weight $W_{c3}$). NV can be determined by substituting these values into the following formula:

$$NV\ [\%]=[(W_{c3}-W_{c2})/W_{c1}]\times 100.$$

The PSA composition disclosed herein contains a tackifying resin of 10 to 40 parts by weight in relation to 100 parts by weight of the component L based on the nonvolatile component (solid component). One or more types selected from tackifying resins, for example, rosin resins, rosin derivative resins, petroleum resins, terpene resins, phenol resins, ketone resins, etc., can be used as the tackifying resin. Examples of the aforementioned rosin resins include, for example, gum rosin, wood rosin, and tall oil rosin, as well as stabilized rosins (e.g., a stabilized rosin wherein an aforementioned rosin is disproportionated or hydrogenated), polymer rosins (e.g., a multimer, typically a dimer, of an aforementioned rosin), modified rosins (e.g., an unsaturated modified rosin, etc., modified by an unsaturated acid such as maleic acid, fumaric acid, (meth)acrylic acid, etc.) and the like. Examples of the aforementioned rosin derivative resins include esterified forms of an aforementioned rosin resin, phenol-modified forms of a rosin resin, and esterified forms thereof. Examples of the aforementioned petroleum resins include aliphatic petroleum resins, aromatic petroleum resins, copolymer petroleum resins, alicyclic petroleum resins, and the hydrogenated forms thereof. Examples of the aforementioned terpene resins include α-pinene resins, β-pinene resins, aromatic modified terpene resins, terpene phenol resins, and the like. Examples of the aforementioned ketone resins include ketone resins obtained by condensation of a ketone (e.g., aliphatic ketones such as methylethyl ketone, methylisobutyl ketone, acetophenone, etc.; and alicyclic ketones such as cyclohexanone, methylcyclohexanone, etc.) with a formaldehyde.

Commercially available tackifying resins include the following: "Super Ester KE-802," "NS-100H," "Super Ester E-865," "Super Ester E-865NT," "Super Ester E-650," "Super Ester E-786-60," "Tamanol E-100," "Tamanol E200," "Tamanol 803L," "Pensel D-160," and "Pensel KK" from Arakawa Chemical Industries, Ltd.; and "YS Polyster-S," "YS Polyster-T," and "Mightyace G" from Yasuhara Chemical Co., Ltd., but are not limited thereto. From the standpoint of cohesiveness, etc., in a high temperature environment, a tackifying resin with a softening point, for example, of approximately 140° C. or higher (typically 140 to 180° C.) can be preferably used. By using a tackifying resin with a softening point of approximately 160° C. or higher (typically 160 to 180° C.), a PSA composition can be provided that delivers a PSA sheet with an even higher level of performance. For example, a PSA composition can be provided with an even higher level of balance of cohesiveness and other properties (one or more properties such as adhesiveness, repulsion resistance, recyclability, etc.).

Such a tackifying resin can be preferably used in the form of an aqueous emulsion wherein the resin is dispersed in water (a tackifying resin emulsion). For example, by mixing aqueous emulsions of the component L and the aforementioned tackifying resin, a PSA composition containing these components in a desired ratio can be easily prepared. It is preferable to use an emulsion that at least contains no substantial amount of an aromatic hydrocarbon solvent (more preferably, one that contains no substantial amount of an aromatic hydrocarbon solvent or other organic solvent) as the tackifying resin emulsion. A PSA sheet with an even lower amount of TVOC can be provided thereby.

The content of tackifying resin, for example, is approximately 40 parts by weight or less in relation to 100 parts by weight of the component L, and more preferably approximately 30 parts by weight or less. The lower limit of the amount of tackifying resin is not particularly limited herein, and normally an excellent effect can be exhibited by setting the content at approximately 11 part by weight or more (preferably 5 parts by weight or more) in relation to 100 parts by weight of the component L. In one preferred embodiment of the PSA composition disclosed herein, the content of the tackifying resin is set at approximately 15 to 35 parts by weight in relation to 100 parts by weight of the component L based on solid content. A PSA composition containing a tackifying resin at such a ratio is preferred because it can form a PSA sheet with an even higher level of performance.

One type of the tackifying resin can be used alone, or two or more types thereof can be used in combination. For example, a tackifying resin with a high softening point (e.g., approximately 140° C. or higher) and a tackifying resin with a lower softening point (e.g., approximately 80 to 120° C.) can be combined and used in a suitable ratio. From the standpoint of cohesiveness in a high temperature environment, approximately 50% or more of the total weight of the tackifying resins to be used is preferably a tackifying resin with a high softening point.

The PSA composition disclosed herein can contain a polymer component other than the component L as an arbitrary component. This other copolymer preferably is one with rubber or elastomer properties, and examples thereof include an ethylene-vinyl acetate copolymer, acrylic rubber, natural rubber (NR), isoprene rubber (IR), styrene-butadiene rubber (SBR), chloroprene rubber (CR), butyl rubber (IIR), ethylene-propylene rubber (EPM, EPDM), polyisobutylene, styrene-ethylene-butylene-styrene copolymer (SEBS), acrylonitrile-butadiene copolymer (NBR), styrene-butadiene-styrene block copolymer (SBS), styrene-isoprene-styrene block copolymer (SIS), a polyvinyl alkyl ether (e.g., polyvinyl isobutyl ether), an acrylic polymer with a Tg higher than −50° C., etc. One type of such a component can be used alone, or two or more types thereof can be used in combination.

Such a polymer component can be used by mixing the same into the aqueous emulsion of the component L in the form of an emulsion of that polymer component dispersed in water. Normally, it is appropriate to set the content of that polymer component (mix ratio) to approximately 20 parts by weight or less (e.g., approximately 5 to 15 parts by weight) in relation to 100 parts by weight of the component L based on nonvolatile components (solid components). The mix ratio of the polymer component can be 5 parts by weight or less, and the formula of the PSA composition can essentially be one does not contain that polymer component.

Moreover, provided the advantageous effect of the present invention is not markedly diminished thereby, the aforementioned PSA composition can supplementally contain a crosslinking agent selected from crosslinking agents generally used in the field of aqueous PSA compositions, for example, a hydrazine crosslinking agent, epoxy crosslinking agent (e.g., polyethylene glycol diglycidyl ether, etc.), carbodiimide crosslinking agent (which has been hydrophilized), isocyanate (preferably a water-dispersed isocyanate) crosslinking agent, oxazoline crosslinking agent, aziridine crosslinking agent, metal chelate crosslinking agent, active methylol crosslinking agent, active alkoxymethyl crosslinking agent, and silane coupling agent, etc. One type of such crosslinking agents can be used alone, or two or more thereof can be suitably combined and used. Alternatively, the PSA composition may have a formulation wherein no such crosslinking agent is admixed thereinto.

The PSA composition disclosed herein can contain an acid or base (aqueous ammonia, etc.) used to adjust the pH, etc. Examples of other arbitrary components that can be contained in the composition include various additives that are generally used in the field of aqueous PSA compositions such as a viscosity regulator (typically a thickener), leveling agent, plasticizer, bulking agent, pigment, dye or other colorant, stabilizer, preservative, and antioxidant. Such publicly known additives can be used in a conventional manner, and because they do not characterize the present invention, a detailed explanation thereof is omitted herein.

Preferably the PSA composition disclosed herein is configured to have a gel fraction Gb of 30 to 60% (e.g., 30 to 50%) of the PSA that is formed from this composition. The gel fraction Gb can be adjusted to the aforementioned preferred range by suitably establishing, for example, the copolymer formulations of the component L, polymerization conditions, whether or not a chain transfer agent will be used therein and the amount thereof, whether or not a crosslinking agent will be admixed therein and the amount thereof, etc. If the aforementioned gel fraction Gb is too low, cohesiveness of the PSA is likely to be in adequate, and adhesive residue is likely to remain on the surface of an adherend when the PSA sheet is peeled off. If the gel fraction Gb is too high, impregnation of the porous support such as a nonwoven fabric, etc., will be inadequate, adhesive residue is likely to remain, and the PSA sheet is likely to tear easily, and the adhesiveness (anchoring) to an irregular surface is likely to decrease.

In the present invention, the term "gel fraction (Gb) of the PSA" refers to the weight ratio of the insoluble component remaining after ethyl acetate extraction of the non-volatile component of the dried PSA composition. The gel fraction Gb can be measured by the method described below. When drying the PSA composition that has been coated onto a release liner, it is desirable to use the same drying conditions as those used for drying the PSA composition when fabricating a PSA sheet.

[Gel Fraction (Gb) Measurement Method]

The PSA composition is applied (typically coated) onto a release liner and dried for 2 min at 100° C. to form a PSA layer on the aforementioned release liner that is approximately 50 μm to 100 μm thick. After this is stored for 3 days at 50° C., a PSA sample of approximately 0.1 g (weight $W_{b1}$ mg) is taken from the aforementioned PSA layer, wrapped in a tetrafluoroethylene resin porous membrane (weight $W_{b2}$ mg) with an average pore size of 0.2 μm in the form of a pouch, and the mouth is tied shut with a string (weight $W_{b3}$ mg). This pouch is placed in a 50 mL screw-cap tube (one screw-cap tube is used for 1 pouch), and the screw-cap tube is filled with ethyl acetate. After letting this stand at room temperature (typically 23° C.) for 7 days, the pouch is removed and dried for 2 hours at 130° C., and the weight of the pouch (weight $W_{b4}$ mg) is measured. The gel fraction (Gb) of the PSA is calculated by inserting the above values into the following formula:

Gel fraction [%]=[($W_{b4}$−$W_{b2}$−$W_{b3}$)/$W_{b1}$]×100.

Preferably a "NITOFLON™ NTF 1122" from Nitto Denko Corp. or an equivalent product will be used for the aforementioned tetrafluoroethylene resin porous membrane.

In accordance with the present invention a PSA sheet featuring a PSA layer formed using any of the PSA compositions disclosed herein is provided. This can be a PSA sheet with a substrate in a mode having such a PSA layer on one or both sides of a sheet-shaped substrate (support), or it can be a PSA sheet without a substrate in a mode wherein the aforementioned PSA layer is retained on a release liner (which can be considered a sheet-like substrate featuring a release surface), etc. Herein, the concept of PSA sheet encompasses items called a PSA tape, PSA label, PSA film, and the like. The aforementioned PSA layer typically will be formed continuously, but is not limited to such a mode, and for example, it can be either a regular or a random pattern of a PSA layer formed in dots, stripes, etc. The PSA sheet provided by the present invention can also be in the form of a roll or a sheet. Alternatively, it can also be a PSA sheet processed into a variety of other shapes.

The PSA sheet disclosed herein can be one having a cross-sectional structure illustrated schematically by FIGS. 1 to 6, for example. Among these, FIGS. 1 and 2 are examples of configurations of a double-sided PSA type of PSA sheet with a substrate. PSA sheet 11 illustrated in FIG. 1 has a PSA layer 2 provided on both sides of a substrate 1, and it has a configuration such that each PSA layer 2 is protected by a release liner 3 wherein at least the PSA layer side thereof is a release side. The PSA sheet 12 illustrated in FIG. 2 provides a PSA layer 2 on both sides of a substrate 1, and it has a configuration such that one of the PSA layers is protected by a release liner 3 wherein both sides thereof are release sides. This type of PSA sheet 12 can be configured such that by winding the PSA sheet 12 upon itself, the PSA layer on the other side comes in contact with the back side of the release liner 3 (which can be a surface rather strongly release-treated in comparison to the front side), and thus the PSA layer on the other side also is protected by the release liner 3.

FIGS. 3 and 4 are examples of configurations of a double-sided PSA sheet without a substrate. The PSA sheet 13 illustrated in FIG. 3 has a configuration such that both sides of a PSA layer 2 without a substrate are each protected by a release liner 3 wherein at least the PSA layer side is a release side. The PSA sheet 14 illustrated in FIG. 4 has a configuration wherein one side of a PSA layer 2 without a substrate is protected by a release liner 3 wherein both sides are release sides, and it is configured so that when it is wound upon itself, the other side of the PSA layer 2 comes in contact with the release liner 3, and thus the other side is also protected by the release liner 3.

FIGS. 5 and 6 are examples of a configuration of a single-sided PSA sheet with a substrate. The PSA sheet 15 illustrated in FIG. 5 has a configuration wherein a PSA layer 2 is provided on one side of a substrate 1, and the front side of that PSA layer 2 (PSA side) is protected by a release liner 3 wherein at least the PSA layer side is a release side. PSA sheet 16 illustrated in FIG. 6 has a configuration wherein a PSA layer 2 is provided on one side of a substrate 1. The other side of the substrate 1 is a release side, and when the PSA sheet 16 is wound on itself, the PSA layer 2 comes in contact with that other side, and thus the front side of that PSA layer (PSA side) is protected by the other side of the substrate 1.

The sheet substrate constituting the PSA sheet can be suitably selected in accordance with the use of the PSA sheet, and examples include a plastic film comprising a resin material such as polyethylene, polypropylene, ethylene-propylene or other polyolefin resin, polyester resin such as polyethylene terephthalate, vinyl acetate resin, polyimide resin, fluorinated resin, polyvinyl chloride resin, cellophane, etc.; rubber sheets comprising natural rubber, butyl rubber, etc.; foam sheets obtained by foaming polyurethane, polychloroprene rubber, polyethylene, etc.; paper such as kraft paper, crepe paper, Japanese paper (washi), etc.; fabric such as cotton fabric, rayon staple fabric, etc.; nonwoven fabric such as cellulose nonwoven fabric, polyester nonwoven fabric, vinylon nonwoven fabric, etc.; metal foil such as aluminum foil, copper foil, etc.; and composites thereof. One or both sides of such a sheet substrate can be surface-treated by coating with a primer, by corona electrical discharge treatment, etc. The thickness of the substrate can be suitably selected depending on the purpose, but in general it will be approximately 10 μm to 500 μm (typically 10 μm to 200 μm).

The release liner (also referred to as a separator) utilized in the construction and/or manufacture of the PSA sheet can be a conventional, publicly known release liner and is not particularly limited herein. For example, a release liner wherein at least one side of a suitable substrate (e.g., glassine paper, kraft paper, clay coated paper, paper coated with a resin film such as polyethylene, etc., paper coated with polyvinyl alcohol and a resin such as an acrylic polymer, etc.) that has been surface-treated by a release agent such as a fluorinated resin, silicone resin, etc., can be preferably used.

When release liners are applied on top of the PSA layers both on one side and on the other side a double-sided PSA sheet, it is preferable to configure the double-sided PSA sheet so that the releasing strength on each side of the release liner (which can constitute one side and the other side of a single release liner) to be applied over the PSA layers is different from the standpoint of increased workability, etc., when a double-sided PSA sheet is used (at the time of application). For example, it is preferable to select a release liner such that the release strength when the release liner is peeled off the PSA layer on the side of the double-sided PSA sheet to be attached first will be less (i.e., will have a lighter release) than the release strength when the release liner is peeled off the PSA layer on the side to be attached next.

The aforementioned PSA layer is formed, for example by applying (typically coating) any of the PSA compositions disclosed herein onto the substrate or release liner and drying the PSA composition. A PSA sheet featuring such a PSA layer can be fabricated by a variety of methods. In the case of a PSA sheet with a substrate, for example the following methods can be used: a method wherein a PSA layer is formed on the substrate by directly applying a PSA composition to the substrate and drying the same, and then applying a release liner on top of the PSA layer; a method wherein a PSA layer formed on top of a release liner is applied to a substrate, the PSA layer is transferred to the substrate and the aforementioned release liner is utilized for the protection of the PSA layer without further processing; and other methods.

The coating of the PSA composition can be carried out using a conventional coater, for example, a rotogravure roll coater, reverse roll coater, case roll coater, deep roll coater, bar coater, knife coater, sprayed coater, and the like.

From the standpoint of increasing the efficiency of removing the aqueous component in the PSA composition and the volatile component such as residual monomer and the like, and for promoting the crosslinking reaction, it is preferable that drying of the composition be carried out by heating. The heating conditions are not particularly limited herein, but preferably a drying temperature of approximately 40° C. to 140° C. (preferably 60° C. to 120° C.) can be utilized. The drying time can be approximately 1 to 5 minutes. The crosslinking reaction can be further promoted by aging (curing) the dried PSA layer under suitable conditions (e.g. an environment at 40° C. or higher (typically 40° C. to 70° C.)).

Although not particularly limited herein, the thickness of the PSA layer (after drying) provided in the PSA sheet disclosed herein can be for example approximately 1 μm to 300 μm (preferably approximately 10 μm to 150 μm).

A double-sided PSA sheet featuring a PSA layer on both sides of a sheet-like substrate can be noted as one preferred embodiment of the PSA sheet disclosed herein. A substrate wherein both one side and the other side are non-releasing can also be used as the aforementioned sheet-like substrate (core).

A nonwoven fabric or other type of fabric or a plastic film (polyester resin film, etc.) can be listed as examples of a sheet like substrate that can preferably be used. As examples of fabrics, woven or nonwoven fabrics used as one type alone or as two or more types in combination (blended fabric) from among fibrous substances such as hemp (Manila hemp, etc.), pulp (wood pulp, etc.) cotton, rayon, vinyl on, acetate fiber, polyvinyl alcohol fiber, polyamide fiber, polyolefin fiber, etc., can be noted. (Natural fibers, synthetic fibers, and semi-synthetic fibers can all be used.) Among these, the use of a nonwoven fabric is preferred. Herein, the term "nonwoven fabric" is a concept referring to a nonwoven fabric for a PSA sheet used mainly in the field of PSA tapes and other PSA sheets, and typically is the kind of nonwoven fabric (sometimes referred to as "paper") that is manufactured using general papermaking equipment.

Preferably the thickness of the nonwoven fiber is approximately 20 μm to 100 μm. A nonwoven fiber with a grammage in the range of approximately 10 to 25 g/m$^2$ can preferably be used. Furthermore, the bulk density (which can be calculated by dividing the aforementioned grammage by the aforementioned thickness) in the range of approximately 0.25 g/cm$^3$ to 0.5 g/cm$^3$ is preferred. A nonwoven fabric wherein the tensile strength both in the machine direction (MD) and in the transverse direction (TD) is approximately 10 N/15 mm or more is preferred, a nonwoven fabric with at least an MD tensile strength of 15 N/15 mm or more (for example, 20N/15 mm or more, preferably 25N/15 mm or more) is more preferred, and one with both an MD and TD tensile strength approximately 15 N/15 mm or more (for example, 20N/15 mm or more) is even more preferred. A nonwoven fabric satisfying such a tensile strength is suitable for configuring a double-sided PSA sheet with excellent tensile strength.

At the stage of manufacturing the nonwoven fabric, a polymer such as viscose, starch, cationic polymer (e.g. polyamide-amine-epichlorhydrin), etc., can be used for the purpose of increasing the strength (e.g. tensile strength) of the nonwoven fiber. Such a polymer (which can be considered a nonwoven fabric strengthening agent) can be added during the papermaking stage of the nonwoven fabric (stage of concentrating the fibers) or the coating or impregnation thereby can be carried out after the papermaking stage. A nonwoven fabric using such a strengthening agent is suitable for constructing a double-sided PSA sheet with excellent tensile strength. Therefore, the use of a nonwoven fabric incorporating the aforementioned kind of strengthening agent is particularly effective in a double-sided PSA sheet to be used for securing recyclable parts, for example.

The method whereby a PSA layer is provided to one side and the other side of the sheet-like substrate is not limited herein. Normally, any method selected from the following can be preferably used for the aforementioned one side and other side: (1) a method wherein a PSA composition is applied to (typically coated onto) a release liner and dried to form a PSA layer on the release liner, and then the PSA layer is transferred by adhering it to the substrate (hereinafter referred to as transfer method); and (2) a method wherein a PSA composition is applied to (typically coated onto) the substrate and dried (hereinafter referred to as the "direct coating method" or "direct method"). For example, a double-sided PSA sheet can be manufactured by applying the transfer method to both sides of the substrate (transfer-transfer method), or a double-sided PSA sheet can be manufactured by applying the transfer method to one side (typically the side wherein the PSA layer is formed first) of the substrate, and the direct coating method to the other side (transfer-direct method). The aforementioned transfer-direct method is preferably used from the standpoint that a double-sided PSA sheet (e.g., a PSA sheet with high tensile strength) suitable for use in securing parts for recycling (e.g., mounting parts for recycling) is easily obtained thereby. In the manufacture of a PSA sheet by this transfer-direct method, the viscosity of the PSA composition used in the direct method can be lower than the viscosity of the PSA composition used in the transfer method. Greater impregnation of the PSA layer into the substrate and a higher level of PSA properties can be realized thereby.

The PSA composition provided by the present invention can form a double-sided PSA sheet satisfying all of the following properties:

(A) The average SUS adhesive strength of 11 N/20 mm or greater;

(B) The average PP adhesive strength of 8.5 N/20 mm or greater;

(C) The hold time in an 80° C. hold test of 1 hour or longer on either side; and (D) The gap height at the edge of the test piece in a curved surface adhesion test of 10 mm or less.

For example, when a double-sided PSA sheet providing PSA layers 60 μm thick formed from the aforementioned PSA composition on one side and the other side of a substrate is fabricated using a cellulose nonwoven fabric with a grammage of 14 g/m² and a thickness of 30 μm (commercially available product) as a sheet-like substrate, that PSA sheet can exhibit performance that satisfies the above properties A to D. The above properties A to D can be evaluated by the peel strength test, 80° C. hold strength test, and curved surface adhesion test, respectively, described below. Normally, suitable drying conditions when forming a PSA layer from the PSA composition are approximately 2 minutes at 100° C. The transfer-direct method can be preferably used as the method of forming the PSA layers on one side and the other side of the substrate.

In relation to property A above, preferably both PSA sides exhibit an SUS adhesive strength of 11 N/20 mm or more. Furthermore, preferably the average value for the SUS adhesive strength of both PSA sides is 12 N/20 mm or more (more preferably, 13 N/20 mm or more). Preferably both PSA sides exhibit an SUS adhesive strength of 12 N/20 mm or more.

In relation to property B above, preferably both PSA sides exhibit a PP adhesive strength of 8.5 N/20 mm or more. Preferably, the average value for the PP adhesive strength of both PSA sides is 9.5 N/20 mm or more, and more preferably both PSA sides exhibit a PP adhesive strength of 9 N/20 mm or more.

In relation to property D above, preferably the gap height of the test piece edge is 7 mm or less, and more preferably 5 mm or less.

In addition to the above properties A to D, the PSA composition provided by the present invention can satisfy one or more of properties E to G below. Therefore, from an another viewpoint the present invention provides a double-sided PSA sheet that also satisfies one or more of properties E to G in addition to properties A to D above.

Property E: In the peel strength test described below, the average value for adhesive strength of both PSA sides in relation to an acrylonitrile-butadiene-styrene copolymer (ABS adhesive strength) is 12 N/20 mm or more. More preferably, both PSA sides exhibit an ABS adhesive strength of 12 N/20 mm or more. It is more preferable for the average value for the ABS adhesive strength of both PSA sides to be 13 N/20 mm or more, and even more preferable for both PSA sides to exhibit an ABS adhesive strength of 12.5 N/20 mm or more.

Property F: The gap height of the test piece edge in the foam repulsion resistance test described below is 5 mm or less. Preferably, the above gap height is 2 mm or less, and more preferably 1 mm or less.

Property G: Adhesive residue does not remain on any of the SUS, PP, and ABS adherends in the peel strength test described below.

In the double-sided PSA sheet disclosed herein suitable tensile strengths of the PSA sheet measured in relation to the machine direction (MD, typically the lengthwise direction in a long and narrow PSA sheet) and the transverse direction (TD) of the nonwoven fabric are both at least approximately 5 N/10 mm or more, and preferably approximately 10 N/10 mm or more. A PSA sheet wherein at least the MD tensile strength is 15 N/10 mm or more is even more preferred. In one preferred embodiment of the technology disclosed herein, a PSA sheet can be provided wherein both the MD and TD tensile strength are approximately 15 N/10 mm or more (preferably, at least the MD tensile strength is 20 N/10 mm or more as well).

To obtain a double-sided PSA sheet satisfying such a tensile strength, the following methods can be used alone or in a suitable combination thereof:

using a nonwoven fabric with a high tensile strength (e.g., a nonwoven fabric having the aforementioned MD and TD tensile strength) as a substrate;

using the direct coating method as the method of forming a PSA layer on at least one side of the substrate;

performing a treatment that adds compressive force in the thickness direction after forming a PSA layer on the substrate (e.g., pressing on a jig at 40° C. or more (typically 40 to 100° C.), preferably 50° C. or more (typically 50 to 90° C.); such a treatment can be preferably carried out using a laminator with the aforementioned roll temperature); and aging by storage for 1 to 7 days, for example, in a heated environment at 40° C. or more (typically 40 to 70° C.). Arranging for even greater impregnation of the PSA layer into the nonwoven fabric thereby is preferred for obtaining a double-sided PSA sheet with even higher tensile strength.

In one preferred embodiment of the PSA sheet disclosed herein, the value of the tensile strength [N/10 mm] when doubled is greater than the value of the adhesive strength [N/20 mm] measured by the method disclosed in the examples below. More specifically, the tensile strength and adhesive strength satisfy this relationship: (tensile strength [N/10 mm]×2)>(adhesive strength [N/20 mm]). A PSA sheet satisfying such a relationship can exhibit excellent tear resistance properties. Therefore, it is most suitable as a PSA sheet to be used for securing recyclable parts. A PSA sheet satisfying the above relationship at least for MD tensile strength is preferred, and a PSA sheet satisfying the above relationship for both MD and TD tensile strength is even more preferred. Furthermore, a PSA sheet satisfying the above relationship for at least PP adhesive strength is preferred, a PSA sheet satisfying the above relationship for both PP and SUS adhesive strength is more preferred, and PSA sheet satisfying the above relationship for PP, SUS, and ABS adhesive strength is even more preferred.

In one preferred embodiment of the PSA sheet (typically double-sided PSA sheet) disclosed herein, the total volatile organic compounds (TVOC) emitted from 1 g of that PSA sheet (comprising a PSA layer and substrate but not including a release liner) when that PSA sheet is heated for 30 min at 80° C. will be 1000 μg or less (hereinafter this is also expressed as "1000 μg/g"). A PSA sheet satisfying such a property (property H) can be preferably used in applications with a strong demand for reduction in VOC, for example, home appliances and office automation equipment used indoors, or automobiles, etc., that constitute enclosed spaces. A PSA sheet with a TVOC of 500 μg or less is preferred, and one with a TVOC of 300 μg or less is even more preferred. The TVOC of a PSA sheet can be measured, for example, by the methods described in the examples below.

EXAMPLES

Below several examples relating to the present invention are described, but the present invention is by no means limited thereto. Furthermore in the following description the terms "parts" and "%" refer to a weight basis unless specifically stated otherwise.

In the following examples the Mw of polymers was measured by the following method. A nonvolatile component obtained by drying the object to be measured for 2 hours at 130° C. was used as a measurement sample, and the soluble component was extracted by soaking the sample at room temperature (typically 23° C.) in THF for 7 days. Then the soluble component was removed by filtration, and the filtrate was either enriched or diluted as needed (after drying once, it can be re-dissolved in THF) to prepare a THF solution containing a suitable concentration (e.g., approximately 0.1 to 0.3 wt %; 0.2 wt % was used herein) of the THF-soluble component. A filtrate was prepared by filtering the THF solution with a filter having an average pore size of 0.45 μm (test solution for molecular weight measurement), and the weight-average molecular weight on a standard polystyrene basis was determined for that filtrate using a gel permeation chromatography (GPC) apparatus. A Tosoh Corporation model "HLC-8120GPC" was used as the GPC apparatus. The following measurement conditions were used.

| [GPC measurement conditions] | |
|---|---|
| Column: | TSKgel GMH-H(S) |
| Detector: | differential refractometer |
| Eluent: | THF |
| Flow rate: | 0.6 mL/min |
| Measurement temperature: | 40° C. |
| Sample concentration: | 0.2 wt % |
| Sample injection amount: | 100 μL |

In the following examples a double-sided PSA sheet was prepared using each of the nonwoven fabrics shown in Table 1.

Herein the tensile strength of the nonwoven fabrics was measured as follows. Specifically, the nonwoven fabric was aligned so the machine direction corresponded to the lengthwise direction, and a test sample was cut from the nonwoven fabric in the shape of a 15 mm wide band. The test sample was mounted on a tensile strength testing machine (180 mm distance between chucks) and following JIS P 8113, the tensile strength [N/15 mm] of the nonwoven fabric was measured lengthwise (machine direction, MD). Then, the nonwoven fabric was aligned so the transverse direction corresponded to the lengthwise direction, and a test sample was cut from the nonwoven fabric in the shape of a 15 mm wide band. In the same manner the tensile strength [N/15 mm] of the nonwoven fabric was measured along the width (TD, transverse direction). The elongation along the length (MD) and the width (TD) of each woven fabric was also measured according to JIS P 8113.

TABLE 1

| | | Nonwoven fabric | | |
|---|---|---|---|---|
| | | B1 | B2 | B3 |
| Material | | Manila hemp 100% | Manila hemp 100% | Manila hemp 100% |
| Grammage [g/m$^2$] | | 18.0 | 23.6 | 22.6 |
| Thickness [μm] | | 60 | 81 | 76 |
| Bulk density [g/cm$^3$] | | 0.30 | 0.29 | 0.30 |
| Tensile strength | MD | 26.0 | 28.3 | 12.5 |
| [N/15 mm] | TD | 19.0 | 21.5 | 11.4 |
| Elongation [%] | MD | 2.1 | 2.1 | 2.9 |
| | TD | 4.4 | 4.2 | 2.5 |

Example 1

A reaction vessel equipped with a stirrer, thermometer, reflux condenser, dripping apparatus, and nitrogen inlet port was loaded with distilled water and 0.1 parts emulsifier, and nitrogen replacement was carried out by stirring 1 hour or longer at 60° C. with an infusion of nitrogen gas. For the emulsifier, a sodium polyoxyethylene alkyl ether sulfate (from Kao Corporation, trade name: "Latemul E-118B", hereinafter simply expressed as "emulsifier") was used. Next 0.1 parts of 2,2'-azobis [N-(2-carboxyethyl)-2-methyl propionamidine]hydrate (Wako Pure Chemical Industries, Ltd., trade name "VA-057") was added as a polymerization initiator. The temperature was held at 60° C., and an emulsion polymerization reaction was carried out by dripping the monomer emulsion into the mixture gradually over 4 hours. An emulsion prepared by adding 67.31 parts 2-ethyl hexyl acrylate (2EHA, Tg –70° C.), 28.85 parts butyl acrylate (BA, Tg –54° C.), 1.44 parts acrylic acid (AA, Tg 106° C.), 2.40 parts methacrylic acid (MAA, Tg 228° C.), 0.020 parts 3-methacryloxy propyl trimethoxy silane (trade name "KBM-503," Shin-Etsu Chemical Co., Ltd., hereinafter expressed by the above trade name), 0.033 parts dodecane thiol (chain transfer agent) and 1.9 parts emulsifier to distilled water and emulsifying the same was used as the monomer emulsion. After dripping of the monomer emulsion was completed, aging was carried out by holding the temperature at 60° C. for 3 hours, and then the heating was discontinued. Next 0.75 parts of 10% aqueous hydrogen peroxide per 100 parts of monomer was added, and after five minutes 0.5 parts of ascorbic acid per 100 parts of monomer was added (redox treatment). After the reaction mixture was cooled to room temperature, the pH of the liquid was adjusted to 7.2 by adding 10% aqueous ammonia to obtain an acrylic polymer emulsion with an NV of approximately 57%. The average particle size of the emulsion was approximately 199 nm. The Tg of the acrylic polymer constituting the emulsion was –61.09° C., the Mw was 53.0×10$^4$, and the gel fraction Gc was 51.0%. The NV, average particle size, Tg, Mw, and gel fraction Gc were each obtained by the methods described above (here and hereinafter).

Example 2

An acrylic polymer emulsion was prepared with an NV of approximately 57% in the same manner as in Example 1 except that the amount of KBM-503 used was changed to the value shown in Table 2.

Example 3

An acrylic polymer emulsion was prepared with an NV of approximately 57% in the same manner as in Example 1 except that the amount of KBM-503 used was changed to the value shown in Table 2.

Example 4

An acrylic polymer emulsion with an NV of approximately 57% was prepared in the same manner as in Example 1 except that the amount of emulsifier loaded into the reaction vessel before the monomer emulsion was supplied (hereinafter, referred to as "amount of emulsifier α") was changed to 0.05 parts, and the amount of emulsifier used in the monomer emulsion (hereinafter, referred to as "amount of emulsifier β") was changed to 1.45 parts.

Example 5

An acrylic polymer emulsion was prepared with an NV of approximately 57% in the same manner as in Example 1 except that the amount of emulsifier a was changed to 0.3 parts and the amount of emulsifier β was changed to 1.7 parts.

Example 6

An acrylic polymer emulsion with an NF of approximately 57% was prepared in the same manner as in Example 1 except no emulsifier was loaded into the reaction vessel, and the amount of emulsifier used in the monomer emulsion (emulsifier β) was set to 2.0 parts.

Table 2 shows a summary of the polymer formulations of Examples 1 to 6 as well as the average particle size, Tg, Mw, and gel fraction Gc of the resulting products. The degree of polymerization of Examples 1 to 6 was 99.5% or more in all cases.

Based on solid content, 20 parts of a water-dispersed rosin resin (Arakawa Chemical Industries, Ltd., trade name "KE-802," softening point 170° C., solid component 50.1%; hereinafter designated by trade name) (tackifying resin) per 100 parts of acrylic polymer (base polymer) was added to the acrylic polymer emulsions obtained in Examples 1 to 6. Additionally, the pH was adjusted to 7.2 using 10% aqueous ammonia as a pH regulator and the viscosity was adjusted to 10 Pa·s using polyacrylic acid (aqueous solution with 36% nonvolatile component, here and hereinafter) as a thickener. Thus, the water-dispersed acrylic PSA compositions shown in Examples 1 to 6 were obtained. The viscosity was measured using a BH viscometer with a No. 2 paddle, rotor speed of 20 rpm, liquid temperature of 30° C. and measurement time of 1 min.

Using the PSA compositions in the above Examples, a double-sided PSA sheet was fabricated in the following sequence. Specifically, two sheets of release liner treated on both sides with a silicone release agent (Kaito Chemical Industry Co., Ltd., trade name "SLB-80WD(V2)") were prepared. PSA composition was applied to one side (first release side) of release liner of one sheet, and dried for 2 minutes at 100° C. to form a PSA layer approximately 60 μm thick on the aforementioned one side. By attaching the release liner with this PSA composition to one side (first side) of nonwoven fabric B1, the transfer method was used to form a first PSA layer on the first side.

Next, an amount of PSA composition to form a dried film thickness of 60 μm was directly coated onto the other side (second side) of the aforementioned nonwoven fabric, dried for 2 minutes at 100° C., and thus the direct method was used to form a second PSA layer on the second side. The other side of a second sheet of aforementioned release liner was placed on top of this second PSA layer (second release side). This laminate having the structure of "release liner (first sheet)/first PSA layer/nonwoven fabric/second PSA layer/release liner (second sheet)" was passed once through a laminator with a roll temperature of 80° C. under conditions of 0.3 MPa pressure and a rate of 0.5 m/min (compression treatment) and then aged by storing for 3 days in an oven at 50° C. The double-sided PSA sheets in Examples 1 to 6 were prepared in this manner.

The double-sided PSA sheets obtained above were subjected to the following evaluation testing. The results obtained are shown in Table 3. In the tables, "side 1" refers to the results when the first PSA layer (transfer side) was applied to an adherend, and "side 2" refers to the results when the second PSA layer (directly coated side) was applied to an adherend.

[Peel Strength]

The release liner covering one side of the double-sided PSA sheet was peeled off, and a 25 μm thick polyethylene terephthalate (PET) film was applied as a base. The backed PSA sheet was cut into sizes of 20 mm wide by 100 mm long to prepare test pieces. The release liner was peeled off the other side of an aforementioned test piece, and the test piece was pressure bonded to an adherend by a single back-and-forth pass with a 2 kg roller. Twenty-minutes after attachment (pressure bonding), the peel strength (N/20 mm wide) was measured following JIS Z0237 at a temperature of 23° C. and relative humidity of 50% using a tensile strength testing machine with a pull rate of 300 mm/min and a pull angle of 180°.

Tables 3 and 4 show the results when the aforementioned peel strength was measured using an SUS304 stainless steel sheet as an adherend as "SUS adhesive strength," the results using a polypropylene resin sheet (PP sheet, a Shin Kobe Electric Machinery Co., Ltd., No. "PP-N-AN" sheet was used) as "PP adhesive strength," and the results when acrylonitrile-butadiene-styrene copolymer resin sheet (ABS sheet, a Shin Kobe Electric Machinery Co., Ltd., No. "ABS-N-WN" sheet was used) as "ABS adhesive strength."

[80° C. Holding Strength]

The release liner covering one side of a double-sided PSA sheet was peeled off the double-sided PSA sheet, and a 25 μm thick PET film was applied as a base. The backed PSA sheet was cut into sizes of 10 mm wide by 100 mm long to prepare test pieces. The release liner was peeled off the other side of the above test piece, and the test piece was compression bonded by a single back-and-forth pass with a 2 kg roller onto a bakelite sheet as an adherend to make a bonding area of 10 mm wide by 20 mm long. After the test piece bonded to the adherend in such a manner was left suspended for 30 min in an 80° C. environment, a 500 g weight was attached to the free end of the test piece, and following JIS Z0237, after the piece was left for 1 hour in the 80° C. environment with the weight attached, the displacement distance (mm) of the test piece was measured.

[Curved Surface Adhesion Test]

A double-sided PSA sheet was cut to have the same surface area (10 mm wide by 90 mm long) as a 10 mm wide by 90 mm long by 0.5 mm thick piece of aluminum. The release liner covering the second PSA layer (directly coated side) was peeled off, and the test piece was aligned and attached to the aluminum. This was wrapped around a 40 mm OD rod (with the aluminum side on the inside) and pressed down for approximately 10 sec to fabricate a curved test piece. The release liner was peeled off the first side (transfer side) of the test piece, and compression bonded to a polypropylene sheet using a laminator. This was left for 24 hours in an environment at 23° C., and after it was heated for 2 hours at 70° C., the gap height (mm) that the edge of the test piece had risen off the surface of the polypropylene sheet was measured. The curved surface adhesion test results shown in Table 3 are average values for the gap height.

[Foam Repulsion Resistance Test]

The release liner covering the second PSA layer (directly coated side) of a double-sided PSA sheet was peeled off, and applied with a laminator to a 10 mm thick urethane foam (Inoac Corporation, trade name "ECS foam"). Test pieces were fabricated by cutting the above into 10 mm wide by 50 mm long slices. The release liner was peeled off the first PSA layer (transfer side) of a test piece, and the test piece was compression bonded by a single back-and-forth pass with a 2 kg roller onto one surface of a 2 mm thick ABS sheet such that the bonded surface area was 10 mm wide by 10 mm long. The remaining part of the test piece (10 mm wide by 40 mm long) was bent approximately 180° and attached to the other side of the ABS sheet. This was left for 24 hours in a 23° C. environment, and after it was placed in a 70° C. environment for 2 hours, the height (mm) that the edge of the test piece had risen off the aforementioned one surface of the ABS sheet (side with the bonded surface of 10 mm wide by 10 mm long) was measured. In Table 3 the term "fully open" indicates that the edge of the test piece had risen so far that the aforementioned bent portion had opened more than 90°.

[PSA Sheet Strength]

A double-sided PSA sheet was cut in 10 mm wide bands such that the machine direction of the nonwoven fabric substrate corresponded to the lengthwise direction, and the release liners were removed from both PSA layers. These pieces were placed in a tensile strength test machine, and under measurement conditions of 23° C. and 50% relative humidity, the maximum strength observed when pulled under conditions of a distance between chucks of 100 mm and a pull rate of 300 mm/min was used as the tensile strength [N/10 mm] in the vertical direction (machine direction, expressed in the tables as "MD") of the PSA sheet. The maximum tensile strength observed under the same conditions for a test piece wherein the double-sided PSA sheet was cut into 10 mm wide bands such that the transverse direction of the nonwoven fabric corresponded to the lengthwise direction was used as the tensile strength [N/10 mm] of the horizontal direction of the PSA sheet (transverse direction, expressed in the tables as "TD").

sive strength, 80° C. hold strength, curved surface adhesion) at the same level or higher. In addition, in the double-sided PSA sheets of Examples 1 to 5 no adhesive residue remained in the peel strength tests using SUS, PP, and ABS as adherends. Thus, the PSA compositions of Examples 1 to 5 satisfied all of properties A to D and formed double-sided PSA sheets that also satisfied properties E to G. It was also confirmed that the PSA sheets of Examples 1 to 5 all exhibited excellent tear prevention properties.

Example 7

In this example the amounts of monomer components and chain transfer agent shown in Table 4 were used, and the monomer emulsion drip time was changed from 4 hours to 3 hours. In all other respects, an acrylic polymer emulsion with an NV of approximately 57% was prepared in the same manner as in Example 6. In other words, in this example no emulsifier was loaded into the reaction vessel.

TABLE 2

| | | Example 1 | Example 2 | Example 3 | Example 4 | Example 5 | Example 6 |
|---|---|---|---|---|---|---|---|
| Polymer formula [parts] | 2EHA | 67.31 | 67.31 | 67.31 | 67.31 | 67.31 | 67.31 |
| | BA | 28.85 | 28.85 | 28.85 | 28.85 | 28.85 | 28.85 |
| | Monomer-b | | | | | | |
| | AA | 1.44 | 1.44 | 1.44 | 1.44 | 1.44 | 1.44 |
| | MAA | 2.40 | 2.40 | 2.40 | 2.40 | 2.40 | 2.40 |
| | (Total) | (3.84) | (3.84) | (3.84) | (3.84) | (3.84) | (3.84) |
| | KBM-503 | 0.020 | 0.016 | 0.012 | 0.020 | 0.020 | 0.020 |
| | Chain transfer agent | 0.033 | 0.033 | 0.033 | 0.033 | 0.033 | 0.033 |
| Average particle size [μm] | | 0.199 | 0.192 | 0.181 | 0.232 | 0.153 | 0.660 |
| Gel fraction Gc [%] | | 51.0 | 48.3 | 50.6 | 55.4 | 56.0 | 38.9 |
| Mw [×10$^4$] | | 53.0 | 56.4 | 56.5 | 51.7 | 47.6 | 71.7 |
| Tg [° C.] | | −61.09 | −61.09 | −61.09 | −61.09 | −61.09 | −61.09 |

TABLE 3

| | | Example 1 | Example 2 | Example 3 | Example 4 | Example 5 | Example 6 |
|---|---|---|---|---|---|---|---|
| SUS adhesive strength [N/20 mm] | Side 1 | 14.9 | 15.7 | 14.4 | 15.3 | 15.9 | 11.3 |
| | Side 2 | 12.8 | 13.8 | 13.0 | 13.8 | 13.8 | 11.0 |
| | Average | 13.9 | 14.8 | 13.7 | 14.6 | 14.9 | 11.2 |
| PP adhesive strength [N/20 mm] | Side 1 | 12.7 | 13.7 | 13.2 | 13.3 | 11.7 | 8.0 |
| | Side 2 | 12.5 | 12.7 | 12.6 | 12.7 | 10.9 | 7.8 |
| | Average | 12.6 | 13.2 | 12.9 | 13.0 | 11.3 | 7.9 |
| ABS adhesive strength [N/20 mm] | Side 1 | 15.0 | 14.4 | 14.3 | 14.5 | 15.4 | 14.3 |
| | Side 2 | 13.3 | 12.8 | 13.5 | 14.1 | 14.1 | 13.3 |
| | Average | 14.1 | 13.6 | 13.8 | 14.3 | 14.8 | 13.8 |
| 80° C. hold strength [mm] | Side 1 | 0.6 | 1.0 | 1.3 | 0.7 | 1.0 | 1.2 |
| | Side 2 | 0.6 | 1.0 | 1.1 | 0.7 | 0.8 | 0.7 |
| Repulsion resistance tests [mm] | | | | | | | |
| Curved surface adhesion | | 1.3 | 1.1 | 1.0 | 1.4 | 1.8 | 1.6 |
| Foam repulsion resistance | | 0.0 | 0.0 | 0.0 | 0.0 | 0.0 | 0.5 |
| PSA sheet strength [N/10 mm] | MD | 16.1 | 16.5 | 15.9 | 16.4 | 16.1 | 16.4 |
| | TD | 10.9 | 11.2 | 11.3 | 11.1 | 11.1 | 10.8 |
| Gel fraction Gb [%] | | 46.1 | 41.5 | 41.3 | 46.1 | 45.7 | 35.6 |

As shown in Tables 2 and 3, among properties A to D, property B (PP adhesive strength) was inadequate in the double-sided PSA sheet of Example 6. On the other hand, in the PSA sheets of Examples 1 to 5, which did not differ greatly from Example 6 in terms of the copolymer components of the acrylic polymer emulsion (component L), but had smaller particles with an average particle size of 0.1 to 0.3 μm, the PP adhesive strength was clearly increased while retaining the other properties (SUS adhesive strength, ABS adhe- Example 8

In this example 0.1 parts of emulsifier α and 1.9 parts of emulsifier β were used. In addition, the drip time of the monomer emulsion was set at 4 hours. In all other respects, an acrylic polymer emulsion with an NV of approximately 51% was prepared in the same manner as in Example 7.

Example 9

An acrylic polymer emulsion with an NV of approximately 53% was prepared in the same manner as in Example 8 except that the amounts of monomer components and chain transfer agent shown in Table 4 were used.

Table 4 shows a summary of the polymer formulations of Examples 7 to 9 as well as the average particle size, Tg, Mw, and gel fraction Gc of the resulting products. The degree of polymerization of Examples 7 to 9 was 99.5% or more in all cases.

Water-dispersed acrylic PSA compositions were prepared in the same manner as in Examples 1 to 6 using the acrylic polymer emulsions of Examples 7 to 9. In other words, 20 parts of a tackifying resin (KE-802) per 100 parts of acrylic polymer was added to the acrylic polymer emulsions obtained in the examples. Additionally, the pH was adjusted to 7.2 using 10% aqueous ammonia, and the viscosity was adjusted to 10 Pa·s using polyacrylic acid as a thickener to obtain the water-dispersed acrylic PSA compositions shown in Examples 7 to 9. Double-sided PSA sheets were prepared using these PSA compositions in the same manner as in Examples 1 to 6, and the properties were evaluated. The results are shown in Table 5.

TABLE 4

|  |  | Example 7 | Example 8 | Example 9 |
|---|---|---|---|---|
| Polymer formula [parts] | 2EHA | 38 | 38 | 38 |
|  | BA | 60 | 60 | 60 |
|  | Monomer b |  |  |  |
|  | AA | 0.75 | 0.75 | 1.25 |
|  | MAA | 1.25 | 1.25 | 0.75 |
|  | (Total) | (2.0) | (2.0) | (2.0) |
|  | KBM-503 | 0.020 | 0.020 | 0.020 |
|  | Chain transfer agent | 0.020 | 0.020 | 0.025 |
| Average particle size [μm] |  | 0.616 | 0.168 | 0.161 |
| Gel fraction Gc [%] |  | 34.3 | 65.9 | 69.9 |
| Mw [×10$^4$] |  | 80.3 | 52.6 | 48.7 |
| Tg [° C.] |  | −58.24 | −58.24 | −58.39 |

TABLE 5

|  |  | Example 7 | Example 8 | Example 9 |
|---|---|---|---|---|
| SUS adhesive strength [N/20 mm] | Side 1 | 10.3 | 10.0 | 11.0 |
|  | Side 2 | 9.3 | 8.5 | 9.8 |
|  | Average | 9.8 | 9.3 | 10.4 |
| PP adhesive strength [N/20 mm] | Side 1 | 10.5 | 10.5 | 10.5 |
|  | Side 2 | 9.0 | 9.0 | 9.3 |
|  | Average | 9.8 | 9.8 | 9.9 |
| ABS adhesive strength [N/20 mm] | Side 1 | 15.0 | 12.8 | 14.5 |
|  | Side 2 | 13.0 | 10.8 | 11.5 |
|  | Average | 14.0 | 11.8 | 13 |
| 80° C. hold strength [mm] | Side 1 | 0.6 | Fell off 34 min | 0.5 |
|  | Side 2 | 0.6 | Fell off 50 min | 0.4 |
| Repulsion resistance tests [mm] |  |  |  |  |
| Curved surface adhesion |  | 10.4 | 11.0 | 10.6 |
| Foam repulsion resistance |  | fully open | 1.7 | fully open |
| PSA sheet strength [N/10 mm] | MD | 16.3 | 16.8 | 16.8 |
|  | TD | 11.3 | 11.3 | 11.5 |
| Gel fraction Gb [%] |  | 37.7 | 50.9 | 50.6 |

Although Examples 7 to 9 intend to increase adhesive strength toward a low-polarity material (in this case, PP) in comparison to Example 6 by decreasing the amount of polar functional groups (in this case, monomer b), they are examples wherein the ratio of BA in the copolymer composition is increased to maintain the Tg of the component L at approximately the same level as Example 6. As shown in Table 3, as a result of this Tg adjustment, the acrylic polymers used in the PSA compositions of Examples 7 to 9 are all ones wherein BA (i.e., an alkyl acrylate with a $C_4$ alkyl group) is the main copolymer component. As shown in Table 5, however, although the PP adhesive strength is increased in comparison with Example 6, the double-sided PSA sheets of Examples 7 to 9 lack balance in performance as a whole because the other properties have decreased. A balance of properties A to D could not be achieved either when the average particle size of the acrylic polymer emulsion was held at approximately the same level as in Example 6 (Example 7), or when the average particle size was made smaller (Examples 8 and 9).

Example 10

An acrylic polymer emulsion with an NV of approximately 57% was prepared in the same manner as in Example 7 except that the monomer components shown in Table 6 were used. In Table 6 the term MA represents methyl acrylate.

Example 11

In this example the amounts of monomer components and chain transfer agent shown in Table 6 were used. Furthermore, 0.1 parts of emulsifier α and 1.9 parts of emulsifier β were used. In all other respects, an acrylic polymer emulsion with an NV of approximately 57% was prepared in the same manner as in Example 10.

Example 12

An acrylic polymer emulsion with an NV of approximately 57% was prepared in the same manner as in Example 11 except that the amounts of monomer components and chain transfer agent shown in Table 6 were used.

Example 13

An acrylic polymer emulsion with an NV of approximately 57% was prepared in the same manner as in Example 11 except that the amounts of monomer components and chain transfer agent shown in Table 6 were used.

Example 14

An acrylic polymer emulsion with an NV of approximately 57% was prepared in the same manner as in Example 11 except that the amounts of monomer components and chain transfer agent shown in Table 6 were used.

Table 6 shows a summary of the polymer formulations of Examples 10 to 14 as well as the average particle size, Tg, Mw, and gel fraction Gc of the resulting products. This table shows, for the sake of comparison, information related to Example 6 indicated in Table 2. The degree of polymerization of Examples 10 to 14 was 99.5% or more in all cases.

Water-dispersed acrylic PSA compositions were prepared in the same manner as in Examples 1 to 6 using the acrylic polymer emulsions of Examples 10 to 14. In other words, 20 parts of a tackifying resin (KE-802) per 100 parts of acrylic polymer was added to the acrylic polymer emulsions obtained in the examples. Additionally, the pH was adjusted to 7.2 using 10% aqueous ammonia, and the viscosity was adjusted to 10 Pa·s using polyacrylic acid as a thickener to obtain the water-dispersed acrylic PSA compositions shown in Examples 10 to 14. Double-sided PSA sheets were prepared using these PSA compositions in the same manner as in Examples 1 to 6, and the properties were evaluated. The results are shown in Table 7. For comparison purposes Table 7 also shows the evaluation results for Example 6 from Table 3.

6, although not to the same extent as in Examples 11 and 12. In addition, in the double-sided PSA sheets of Examples 10 to 14, no adhesive residue remained in the peel strength tests using SUS, PP, and ABS as adherends. It was also confirmed that the PSA sheets of Examples 10 to 12 all exhibited excellent tear prevention properties.

TABLE 6

|  |  | Example 10 | Example 11 | Example 12 | Example 13 | Example 14 | Example 6 |
|---|---|---|---|---|---|---|---|
| Polymer formula [parts] | 2EHA | 87 | 85 | 85 | 86.16 | 86.16 | 67.31 |
|  | BA |  |  |  |  |  | 28.85 |
|  | MA | 10 | 13 | 13 | 10 | 10 |  |
|  | Monomer b |  |  |  |  |  |  |
|  | AA | 1.1 | 1.25 | 0.75 | 1.44 | 2.40 | 1.44 |
|  | MAA | 1.9 | 0.75 | 1.25 | 2.40 | 1.44 | 2.40 |
|  | (Total) | (3.0) | (2.0) | (2.0) | (3.84) | (3.84) | (3.84) |
|  | KBM-503 | 0.020 | 0.020 | 0.020 | 0.020 | 0.020 | 0.020 |
|  | Chain transfer agent | 0.020 | 0.033 | 0.033 | 0.033 | 0.033 | 0.033 |
| Average particle size [μm] |  | 0.659 | 0.202 | 0.205 | 0.204 | 0.209 | 0.660 |
| Gel fraction Gc [%] |  | 56.8 | 48.1 | 47.1 | 59.4 | 46.3 | 38.9 |
| Mw [×10$^4$] |  | 69.9 | 51.1 | 49.9 | 47.3 | 55.6 | 71.7 |
| Tg [° C.] |  | −60.63 | −60.15 | −60.15 | −59.62 | −59.91 | −61.09 |

TABLE 7

|  |  | Example 10 | Example 11 | Example 12 | Example 13 | Example 14 | Example 6 |
|---|---|---|---|---|---|---|---|
| SUS adhesive strength [N/20 mm] | Side 1 | 12.8 | 17.5 | 16.3 | 14.5 | 15.5 | 11.3 |
|  | Side 2 | 11.8 | 15.8 | 13.8 | 13.3 | 15.0 | 11.0 |
|  | Average | 12.3 | 16.7 | 15.1 | 13.9 | 15.3 | 11.2 |
| PP adhesive strength [N/20 mm] | Side 1 | 14.0 | 14.2 | 15.1 | 13.0 | 14.8 | 8.0 |
|  | Side 2 | 11.8 | 13.0 | 12.7 | 11.0 | 12.2 | 7.8 |
|  | Average | 12.9 | 13.6 | 13.9 | 12.0 | 13.5 | 7.9 |
| ABS adhesive strength [N/20 mm] | Side 1 | 17.0 | 18.0 | 15.8 | 15.8 | 16.3 | 14.3 |
|  | Side 2 | 15.0 | 15.5 | 13.0 | 13.8 | 13.8 | 13.3 |
|  | Average | 16.0 | 16.8 | 14.4 | 14.8 | 15.1 | 13.8 |
| 80° C. hold strength [mm] | Side 1 | 0.4 | 0.6 | 0.7 | 0.6 | 0.8 | 1.2 |
|  | Side 2 | 0.3 | 0.7 | 0.9 | 0.6 | 0.8 | 0.7 |
| Repulsion resistance tests [mm] |  |  |  |  |  |  |  |
| Curved surface adhesion |  | 3.1 | 2.8 | 2.9 | 2.9 | 2.6 | 1.6 |
| Foam repulsion resistance |  | 0.3 | 0.5 | 0.5 | 0.5 | 0.3 | 0.5 |
| PSA sheet strength [N/10 mm] | MD | 16.6 | 16.0 | 15.7 | 16.2 | 15.9 | 16.4 |
|  | TD | 11.2 | 11.2 | 11.1 | 11.7 | 11.2 | 10.8 |
| Gel fraction Gb [%] |  | 50.4 | 40.3 | 38.9 | 50.0 | 43.6 | 35.6 |

Just as in Examples 7 to 9, Examples 10 to 12 intend to increase adhesive strength toward a low-polarity material by decreasing the amount of polar functional groups used, but they are examples that use MA (Tg (8° C.) as a copolymer component to maintain the Tg of the component L at the same level as in Example 6. In such a system wherein 2EHA was used as the main copolymer component and Tg was adjusted by copolymerization with a monomer having a copolymer Tg of −25° C. or higher (in this case, MA), it was possible to increase the adhesive strength toward PP while maintaining the other properties at the same level as in Example 6 or higher, unlike Examples 7 to 9 which used BA as the main polymer component. This effect was seen when the average particle size of the acrylic polymer emulsion was approximately the same as in Example 6 (Example 10), and an even more dramatic effect was realized in Examples 11 and 12 wherein the particle size was made even smaller. Furthermore, it was possible to increase PP adhesive strength while maintaining the other properties when the amount of monomer b used in the above systems was the same as in Example Example 15

Just as in Example 1, a reaction vessel was loaded with distilled water and 0.1 parts emulsifier, and nitrogen replacement was carried out by stirring 1.5 hours at 60° C. with an infusion of nitrogen gas. Then 0.1 parts polymerization initiator was added to the reaction vessel just as in Example 1, and while maintaining the system at 60° C., a monomer emulsion was slowly dripped in over 4 hours to carry out an emulsion polymerization reaction. An emulsion prepared by adding 85.03 parts of 2EHA, 13.13 parts of MA, 1.08 parts of AA, 0.76 parts of MAA, 0.020 parts of KBM-503, 0.033 parts of dodecane thiol as a chain transfer agent, and 1.9 parts of emulsifier to distilled water and emulsifying the same was used as the monomer emulsion. After dripping of the monomer emulsion was completed, aging was carried out by holding the temperature at 60° C. for 3 hours, and then the heating was discontinued. Next 0.62 parts of 10% aqueous hydrogen peroxide per 100 parts of monomer was added, and after five minutes 0.15 parts of ascorbic acid per 100 parts of monomer was added. After the reaction mixture was cooled to room temperature, the pH of the liquid was adjusted to 7.2 by adding 10% aqueous ammonia to obtain an acrylic polymer emulsion with an NV of approximately 51.6%. The average particle size of the emulsion was 209 nm. The Tg of the acrylic polymer constituting the emulsion was −60.22° C., the Mw was $48.4 \times 10^4$, the gel fraction Gc was 50.1%, and the degree of polymerization was approximately 99.8%. Hereinafter, the water-dispersed acrylic polymer (base polymer) obtained in this example is called A1.

Example 16

In this example 0.5 parts of α-pinene was used in place of dodecane thiol as the chain transfer agent, but in all other respects it was the same as in Example 15, and an acrylic polymer emulsion with an NV of approximately 51.6% was obtained. Hereinafter, the water-dispersed acrylic polymer (base polymer) obtained in this example is called A2. The degree of polymerization in this example was approximately 99.8%.

Example 17

Just as in Example 1, a reaction vessel was loaded with distilled water and 0.1 parts emulsifier, and nitrogen replacement was carried out by stirring 1.5 hours at 60° C. with an infusion of nitrogen gas. Then 0.1 parts polymerization initiator was added to the reaction vessel just as in Example 1, and while maintaining the system at 60° C., a monomer emulsion was slowly dripped in over 4 hours to carry out an emulsion polymerization reaction. An emulsion prepared by adding 67.13 parts of 2EHA, 29 parts of BA, 1.44 parts of AA, 2.43 parts of MAA, 0.030 parts of dodecane thiol as a chain transfer agent, and 1.9 parts of emulsifier to distilled water and emulsifying the same was used as the monomer emulsion. After dripping of the monomer emulsion was completed, aging was carried out by holding the temperature at 60° C. for 3 hours, and then the heating was discontinued. Next 0.75 parts of 10% aqueous hydrogen peroxide per 100 parts of monomer was added, and after five minutes 0.15 parts of ascorbic acid per 100 parts of monomer was added. After the reaction mixture was cooled to room temperature, the pH of the liquid was adjusted to 7.2 by adding 10% aqueous ammonia to obtain an acrylic polymer emulsion with an NV of approximately 56.7%. Hereinafter, the water-dispersed acrylic polymer (base polymer) obtained in this example is called A3. The degree of polymerization in this example was approximately 99.5%.

Table 8 shows a summary of the polymer formulations of Examples 15 to 17 as well as the average particle size, Tg, Mw, and gel fraction Gc of the resulting products.

Example 18

A water-dispersed acrylic PSA composition was obtained in this example by adding 30 parts of KE-802 (tackifying resin) to 100 parts of base polymer A1 obtained in Example 15, and adjusting the pH to 7.2 with 10% aqueous ammonia and the viscosity to 10 Pa·s with polyacrylic acid. A double-sided PSA sheet was fabricated just as in Examples 1 to 6 except that the thickness of both the first PSA layer and the second PSA layer were set at approximately 50 μm.

Example 19

In this example both 20 parts of KE-802 and 10 parts of a different water-dispersed rosin resin (Arakawa Chemical Industries, Ltd., trade name "NS-100H," softening point 100° C., solid component 50.5%; hereinafter designated by trade name) were added per 100 parts of base polymer A1 as the tackifying resin. A water-dispersed acrylic PSA composition was obtained in the same manner as in Example 18 in all other respects. A double-sided PSA sheet was fabricated using this composition in the same manner as in Example 18.

Example 20

The PSA composition of this example was prepared in the same manner as in Example 18 except that 20 parts of KE-802 was added to 100 parts of base polymer A1. Using this composition a double-sided PSA sheet was fabricated in the same manner as in Example 18 except that nonwoven fabric B2 was used instead of nonwoven fabric B1.

Example 21

In this example, after a first PSA layer was formed by the transfer method on the first side of nonwoven fabric B1, a PSA composition was coated onto the other side (second release side) of the release liner, and dried for 2 min at 100° C. to form a PSA layer approximately 50 μm thick on the aforementioned other side. By applying this PSA layer to the other side (second side) of the aforementioned nonwoven fabric, a second PSA layer was formed on the second side thereof by the transfer method. In all other respects, a double-sided PSA sheet was fabricated in the same manner as in Example 20.

Example 22

A double-sided PSA sheet was fabricated in the same manner as in Example 18 except nonwoven fabric B3 was used instead of nonwoven fabric B1.

Example 23

In this example base polymer A2 obtained in Example 16 was used, and 20 parts of KE-802 per 100 parts of base polymer was added as a tackifying resin. In all other respects, a PSA composition was prepared in the same manner as in Example 18. Using this composition a double-sided PSA sheet was fabricated in the same manner as in Example 18.

Example 24

A PSA composition was prepared in the same manner as in Example 23 except that 10 parts of NS-100H were used in addition to 20 parts of KE-802 as the tackifying resin. Using this composition a double-sided PSA sheet was fabricated in the same manner as in Example 23 except that nonwoven fabric B3 was used instead of nonwoven fabric B1.

Example 25

The water-dispersed acrylic PSA composition of this example was obtained by adding 20 parts of KE-802 and 0.13 parts of an epoxy crosslinking agent (Nagase ChemTex Corporation, trade name "Denacol EX-512") to 100 parts of base polymer A3 obtained in Example 17, and adjusting the pH to 7.2 with 10% aqueous ammonia and the viscosity to 10 Pa·s with polyacrylic acid. Using this composition a double-sided PSA sheet was fabricated in the same manner as in Example 18.

The properties of the double-sided PSA sheets of Examples 18 to 25 were evaluated in the same manner as above. Tables 9 and 10 show the results.

TABLE 8

| | | Example 15 | Example 16 | Example 17 |
|---|---|---|---|---|
| Polymer formula [parts] | 2EHA | 85.03 | 85.03 | 67.13 |
| | BA | | | 29.00 |
| | MA | 13.13 | 13.13 | |
| | Monomer-b | | | |
| | AA | 1.08 | 1.08 | 1.44 |
| | MAA | 0.76 | 0.76 | 2.43 |
| | (Total) | (1.84) | (1.84) | (2.0) |
| | KBM-503 | 0.020 | 0.020 | — |
| | Chain transfer agent | | | |
| | Dodecane thiol | 0.033 | | 0.030 |
| | α-pinene | | 0.5 | |
| Average particle size [μm] | | 0.209 | 0.209 | 0.182 |
| Gel fraction Gc [%] | | 50.1 | 48.4 | 39.2 |
| Mw [×10$^4$] | | 48.4 | 72.5 | 88.9 |
| Tg [° C.] | | −60.22 | −60.22 | −61.03 |

TABLE 9

| | | Example 18 | Example 19 | Example 20 | Example 21 | Example 22 |
|---|---|---|---|---|---|---|
| Base polymer | | A1 | A1 | A1 | A1 | A1 |
| Tackifying resin | KE-802 | 30 | 20 | 20 | 20 | 30 |
| | NS-100H | | 10 | | | |
| Nonwoven fabric | | B1 | B1 | B2 | B2 | B3 |
| SUS adhesive strength [N/20 mm] | Side 1 | 18.3 | 16.5 | 14.0 | 20.0 | 18.0 |
| | Side 2 | 17.5 | 14.8 | 17.0 | 14.0 | 17.5 |
| | Average | 17.9 | 15.7 | 15.5 | 17.0 | 17.8 |
| PP adhesive strength [N/20 mm] | Side 1 | 14.3 | 14.5 | 13.3 | 18.8 | 14.5 |
| | Side 2 | 14.0 | 13.3 | 14.0 | 12.3 | 15.5 |
| | Average | 14.2 | 13.9 | 13.7 | 15.6 | 15.0 |
| ABS adhesive strength [N/20 mm] | Side 1 | 22.0 | 19.8 | 15.3 | 20.0 | 18.8 |
| | Side 2 | 21.3 | 19.5 | 15.8 | 14.5 | 18.8 |
| | Average | 21.7 | 19.7 | 15.6 | 17.3 | 18.8 |
| 80° C. hold strength [mm] | Side 1 | 0.5 | 0.6 | 0.9 | 1.1 | 0.8 |
| | Side 2 | 0.5 | 0.7 | 0.7 | 0.8 | 0.9 |
| Repulsion resistance tests [mm] | | | | | | |
| Curved surface adhesion | | 3.7 | 2.8 | 3.6 | 2.1 | 3.6 |
| Foam repulsion resistance | | 0.5 | 0.0 | 0.0 | 0.5 | 0.3 |
| PSA sheet strength [N/10 mm] | MD | 16.2 | 15.9 | 24.6 | 24.3 | 29.0 |
| | TD | 11.1 | 11.4 | 18.7 | 18.3 | 23.0 |
| Gel fraction Gb [%] | | 52.5 | 44.9 | 38.7 | 40 | 38 |

TABLE 10

| | | Example 23 | Example 24 | Example 25 |
|---|---|---|---|---|
| Base polymer | | A2 | A2 | A3 |
| Tackifying resin | KE-802 | 20 | 20 | 20 |
| | NS-100H | | 10 | |
| Nonwoven fabric | | B1 | B3 | B1 |
| SUS adhesive strength [N/20 mm] | Side 1 | 16.0 | 15.3 | 14.2 |
| | Side 2 | 13.5 | 15.8 | 13.8 |
| | Average | 14.8 | 15.6 | 14.0 |
| PP adhesive strength [N/20 mm] | Side 1 | 13.3 | 15.3 | 10.4 |
| | Side 2 | 13.0 | 14.7 | 11.3 |
| | Average | 13.2 | 15.0 | 10.9 |
| ABS adhesive strength [N/20 mm] | Side 1 | 16.5 | 16.0 | 14.7 |
| | Side 2 | 14.8 | 16.0 | 13.8 |
| | Average | 15.7 | 16.0 | 14.3 |
| 80° C. hold strength [mm] | Side 1 | 1.2 | 1.0 | 0.9 |
| | Side 2 | 1.0 | 0.9 | 0.7 |
| Repulsion resistance tests [mm] | | | | |
| Curved surface adhesion | | 3.0 | 2.9 | 1.3 |
| Foam repulsion resistance | | 0.0 | 0.0 | 0.5 |
| PSA sheet strength [N/10 mm] | MD | 16.1 | 20.5 | 16.2 |
| | TD | 11.1 | 18.3 | 11.8 |
| Gel fraction Gb [%] | | 38 | 36.8 | 46.1 |

As shown in these tables, PSA sheets exhibiting excellent PSA properties were obtained in the examples with an increased amount of tackifying resin (Examples 18, 19, 22, and 24), the examples using a combination of two types of tackifying resin (Examples 19 and 24), the examples with a nonwoven fabric different from that of Examples 1 to 14 (Examples 20 to 22 and 24), the examples with a base polymer obtained using a chain transfer agent different from that of Examples 1 to 14 (Examples 23 and 24), and the example wherein the PSA composition was prepared by adding an epoxy crosslinking agent to the base polymer (Example 25). Furthermore, the PSA sheets of Examples 18 to 25 did not leave an adhesive residue in any of the peel strength tests using SUS, PP, and ABS as adherends. Thus, the PSA compositions of Examples 18 to 25 satisfied all of properties A to D, and formed double-sided PSA sheets satisfying properties E to G. It was also confirmed that the PSA sheets of Examples 18 to 25 all exhibited excellent tear resistance.

[Measurement of Total Volatile Organic Compounds (TVOC)]

The double-sided PSA sheets of Examples 1 to 14 and Examples 18 to 25 were cut into a desired size (herein, a size with a surface area approximately 5 cm$^2$), the release liner covering one of the PSA layers was peeled off and attached to aluminum foil. The release liner was peeled off the other PSA layer and exposed to prepare a test piece. The test piece was placed in a 20 mL vial and the vial was sealed. Next, the vial was heated for 30 min at 80° C., and 1.0 mL of hot gas therefrom (sample gas) was injected into a gas chromatograph (GC) using a headspace autosampler (HSS). Based on the resulting gas chromatogram, the amount of gas emitted from the test piece was determined as an amount converted to n-decane. The n-decane converted value was determined by considering the detected strength of the emitted gas obtained by GC/mass spectrometry to be the detected strength of n-decane and utilizing an n-decane calibration curve prepared beforehand. As a result, the double-sided PSA sheets of Examples 1 to 14 and Examples 18 to 25 all had a TVOC of 500 μg/g or less (more specifically, 200 μg/g or less).

A Hewlett Packard model 7694 was used as the aforementioned HSS under the following conditions:

| | |
|---|---|
| Oven temperature: | 80° C. |
| Heating time: | 30 min |
| Pressurization time: | 0.12 min |
| Loop fill time: | 0.12 min |
| Loop equilibration time: | 0.05 min |
| Inject time: | 3 min |
| Sample loop temperature: | 160° C. |
| Transfer line temperature: | 200° C. |

A Hewlett Packard model 6890N was used for gas chromatography (GC) under the following conditions:

| | |
|---|---|
| Column: | DB-FFAP, 30 m × 0.535 mm φ, id × 1.0 mμ film thickness |
| Column temperature: | 40° C. (0 min)-<+10° C./min>-90° C. (0 min)-<+20° C./min>-250° C. (2 min) [This means the temperature was raised from 40° C. to 90° C. at a rate of 10° C./min, then after it was raised to 250° C. at a rate of 10° C./min, it was held at 250° C. for 2 min.] |
| Column pressure: | 24.3 kPa (constant flow mode) |
| Carrier gas: | He (5.0 mL/min) |
| Injection port: | Split (split ratio 12:1) |
| Injection port temperature: | 250° C. |
| Detector: | FID |
| Detection temperature: | 250° C. |

Specific examples of the present invention have been described in detail above, but these are merely examples and the claims of the present invention are by no means limited thereto. The technology disclosed in the claims encompasses a variety of modifications and changes to the specific examples illustrated above.

What is claimed is:

1. A water-dispersed pressure-sensitive adhesive composition comprising (a) as a base polymer thereof a water-dispersed acrylic copolymer (component L) with a glass transition temperature (Tg) in the range of −70° C. to −50° C., and (b) 10 to 40 parts by weight of a tackifying resin (component T) in relation to 100 parts by weight of the component L based on solid content,
   wherein the component L is an acrylic copolymer obtained by polymerization of a monomer starting material comprising:
   60 wt % or more of an alkyl (meth)acrylate having a $C_{8-12}$ alkyl group, and
   5 wt % or less of a radical polymerizable monomer having a carboxyl group (monomer b), wherein the monomer b comprises acrylic acid and methacrylic acid at an acrylic acid/methacrylic acid weight ratio of 0.3 to 4; and
   wherein, when a double-sided pressure-sensitive adhesive sheet is fabricated using the adhesive composition, the pressure-sensitive adhesive sheet satisfies all of the following properties:
   (A) an average adhesive strength on stainless steel of 11 N/20 mm or greater on either side;
   (B) an average adhesive strength on polypropylene of 8.5 N/20 mm or greater on either side;
   (C) a hold time in an 80° C. holding strength test of 1 hour or longer on either side; and
   (D) a gap height of an edge of a test piece in a curved surface adhesion test of 10 mm or less.

2. The composition according to claim 1, wherein the polymer L constitutes an aqueous emulsion with an average particle size of 0.1 μm to 0.4 μm.

3. The composition according to claim 1, wherein the monomer starting material comprising the monomer b in an amount of 1 to 3 wt %.

4. The composition according to claim 1, wherein the monomer starting material further contains one or more types of a monomer (monomer c) selected from alkyl (meth)acrylates with a homopolymer Tg of −25° C. or higher (excluding a compound corresponding to monomer a) and cycloalkyl (meth)acrylates in an amount of 3 to 35 wt %.

5. The composition according to claim 4, wherein the monomer c has a $C_{1-2}$ alkyl methacrylate as a main component thereof.

6. The composition according to claim 1, wherein the monomer starting material further contains a monomer (monomer d) capable of forming a silanol group in an amount of 0.005 to 0.1 wt %.

7. A pressure-sensitive adhesive sheet, comprising a pressure-sensitive adhesive layer formed from the composition according to claim 1.

8. The pressure-sensitive adhesive sheet according to claim 7, wherein the pressure-sensitive adhesive layer is formed to have a gel fraction Gb of 30% to 60%.

9. The pressure-sensitive adhesive sheet according to claim 7, constituted as a double-sided adhesive sheet comprising the adhesive layer on each side of a substrate sheet and satisfying all of the properties (A) through (D).

10. The double-sided adhesive sheet according to claim 9, wherein the substrate is of a nonwoven fabric and the pressure-sensitive adhesive sheet has a tensile strength of 10 N/10 mm or greater measured both in a machine direction and a transverse direction of the nonwoven fabric.

11. The pressure-sensitive adhesive sheet according to claim 7, wherein the pressure-sensitive adhesive sheet secures recyclable parts.

12. A double-sided pressure-sensitive adhesive sheet comprising a sheet-shaped substrate and the pressure-sensitive adhesive layer according to claim 7 formed on both sides of the sheet-shaped substrate, wherein a total amount of volatile organic compounds (TVOC) emitted from the sheet when the adhesive sheet is heated at 80° C. for 30 minutes is 1000 μg or less per gram of the adhesive sheet.

13. A water-dispersed pressure-sensitive adhesive composition comprising as a base polymer thereof a water-dispersed acrylic copolymer (component L) with a glass transition temperature (Tg) in the range of −70° C. to −50° C.,
   wherein the component L is obtained by polymerization of a monomer starting material comprising 5 wt % or less of a radical polymerizable monomer having a carboxyl group (monomer b), wherein the monomer b comprises acrylic acid and methacrylic acid at an acrylic acid/methacrylic acid weight ratio of 0.3 to 4; and
   wherein, when a double-sided adhesive sheet is fabricated using the adhesive composition, the pressure-sensitive adhesive sheet satisfies all of the following properties:
   (B) an average adhesive strength on polypropylene of 8.5 N/20 mm or greater on either side;

(C) a hold time in an 80° C. holding strength test of 1 hour or longer on either side;

(D) a gap height at an edge of a test piece in a curved surface adhesion test of 10 mm or less; and (H) a total amount of volatile organic compounds (TVOC) emitted from the sheet when heated for 30 min at 80° C. being 1000 μg or less per 1 gram of the adhesive sheet.

14. The composition according to claim 13, wherein the base polymer consists of the component L.

15. The composition according to claim 1, wherein the base polymer consists of the component L.

* * * * *